US011500956B2

(12) United States Patent
Mohri

(10) Patent No.: US 11,500,956 B2
(45) Date of Patent: Nov. 15, 2022

(54) INFORMATION PROCESSING APPARATUS, INFORMATION PROCESSING SYSTEM, INFORMATION PROCESSING METHOD, AND PROGRAM

(71) Applicant: Takanori Mohri, Kanagawa (JP)

(72) Inventor: Takanori Mohri, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/104,507

(22) Filed: Nov. 25, 2020

(65) Prior Publication Data

US 2021/0165849 A1 Jun. 3, 2021

(30) Foreign Application Priority Data

Nov. 29, 2019 (JP) .............. JP2019-217424
Oct. 28, 2020 (JP) .............. JP2020-180718

(51) Int. Cl.
*G06F 16/14* (2019.01)
*G06F 16/957* (2019.01)
*G06F 16/9538* (2019.01)
*G06F 16/958* (2019.01)
*G06F 16/955* (2019.01)

(52) U.S. Cl.
CPC ........ *G06F 16/9577* (2019.01); *G06F 16/958* (2019.01); *G06F 16/9538* (2019.01); *G06F 16/9566* (2019.01)

(58) Field of Classification Search
CPC .. G06F 40/143; G06F 16/9577; G06F 16/958; G06F 16/9566; G06F 16/9538; G06F 16/144; G06F 16/156
USPC ................................. 715/234, 200
See application file for complete search history.

(56) References Cited

U.S. PATENT DOCUMENTS

| 6,356,908 B1* | 3/2002 | Brown ............... G06F 16/957 |
| 7,996,393 B1* | 8/2011 | Nanno ............... G06F 16/353 |
| | | 707/723 |
| 10,223,439 B1* | 3/2019 | Baker ............... G06F 16/3322 |
| 2018/0330252 A1* | 11/2018 | Sawano ............ G06F 16/2428 |

(Continued)

FOREIGN PATENT DOCUMENTS

| JP | 2005-084739 | 3/2005 |
| JP | 4885070 | 2/2012 |
| JP | 2018-195298 | 12/2018 |

OTHER PUBLICATIONS

Sze Tho ChangSheng, Chatbots Will Change the Way We Do Search, published Mar. 10, 2017 via chatbotmagazine.com, pp. 1-10 (pdf).*

(Continued)

*Primary Examiner* — Manglesh M Patel
(74) *Attorney, Agent, or Firm* — IPUSA, PLLC

(57) ABSTRACT

An information processing apparatus connected to a user terminal that receives input from a user, includes a memory; and a processor. The processor is configured to execute obtaining input information input into the user terminal; searching for response information corresponding to the input information; responding to the user terminal with a response message based on the response information corresponding to the input information; obtaining an access target to be accessed by the user terminal in order for the user terminal to receive the input of the input information by the user; and changing the search by the searching or a response by the responding based on the access target.

11 Claims, 21 Drawing Sheets

(56) References Cited

U.S. PATENT DOCUMENTS

2020/0026734 A1   1/2020  Mohri
2021/0073475 A1*  3/2021  Narukawa ............... H04L 51/02
2021/0165787 A1*  6/2021  Kimura ............... G06F 16/2423

OTHER PUBLICATIONS

Anurabisht, Building End to End Search Engine CHatbot for the website using Amazon Lex, Google knowledge Graph . . . , published Oct. 1, 2020 via TowardsAI.net, pp. 1-21 (pdf).*

* cited by examiner

FIG.6

| ID | CATEGORY NAME | UPDATE DATE AND TIME |
|---|---|---|
| 0-1 | MOVING IN | 2017-07-11T07:07 |
| 0-2 | MOVING OUT | 2017-07-11T07:10 |
| 0-3 | CELEBRATION | 2018-02-07T16:40 |
| 0-4 | FUNERAL | 2018-02-07T16:55 |
| 0-5 | INSURANCE | 2017-03-14T10:30 |
| 0-6 | UNION | 2018-03-08T09:30 |
| 0-7 | DELIVERY DATE | 2018-06-12T14:20 |
| ... | ... | ... |

FIG.7

| ID | QUESTION | SIMILAR QUESTION | ANSWER | CATEGORY ID | UPDATE DATE AND TIME |
|---|---|---|---|---|---|
| ... | ... | ... | ... | ... | ... |
| 1-11 | LIST OF PROCEDURE REQUIRED UPON CHILDBIRTH | — | CHILDBIRTH OF EMPLOYEE OR SPOUSE NEEDS APPLICATIONS: 1. CHANGE IN FAMILY MEMBERS 2. GIFT MONEY 3. HEALTH INSURANCE, MEMBER CHANGE 4. HEALTH INSURANCE, GIFT MONEY 5. STOP OF COMMUTATION ALLOWANCE | 0-03 | 2018-02-07T16:22 |
| 1-12 | APPLICATION OF GIFT MONEY ON CHILDBIRTH | — | UPON CHILDBIRTH OF EMPLOYEE OR SPOUSE, GIFT MONEY, COST SUPPORT, AND HOLIDAYS ARE GRANTED. | 0-03 | 2018-02-07T16:40 |
| ... | ... | ... | ... | ... | ... |
| 1-33 | HOW TO USE SIMPLE DELIVERY-DATE QUOTE | | SELECT OR ENTER THE FIELD OF PRODUCTS TO BE ORDERED. | 0-07 | 2018-06-12T14:20 |
| ... | ... | | ... | | ... |

FIG.8

| ID | SESSION ID | CATEGORY ID ASSOCIATED WITH HIT QUESTION | HIT QUESTION ID | USER INPUT | FEED-BACK | DATE AND TIME |
|---|---|---|---|---|---|---|
| 3-1 | zeta/Guest/aaa···.bbbb | 0-05 | 1-55 | WANT TO KNOW TYPES OF INSURANCES | Yes | 2018-04-11T10:15 |
| 3-2 | zeta/Guest/36c2a9cc-6258-4276-ab0d-d2b739ac65a3 | 0-03 | 1-11 | WHAT TO DO UPON CHILDBIRTH | Yes | 2018-03-30T14:01 |
| 3-3 | zeta/Guest/36c2a9cc-6258-4276-ab0d-d2b739ac65a3 | 0-03 | 1-12 | APPLICATION OF GIFT MONEY ON CHILDBIRTH | No | 2018-03-30T14:15 |
| 3-4 | zeta/Guest/xxx···.yyy···.zzz | 0-05 | 1-56 | ENTRY PROCEDURE OF INSURANCE | No | ⋮ |
| 3-5 | zeta/Guest/xxx···.yyy···.zzz | 0-05 | 1-57 | ENTRY PROCEDURE OF LIFE INSURANCE | Yes | ⋮ |
| 3-6 | zeta/Guest/xxx···.yyy···.zzz | 0-05 | 1-58 | WANT TO KNOW HOW TO CANCEL INSURANCE | Yes | ⋮ |
| ⋮ | ⋮ | ⋮ | ⋮ | ⋮ | ⋮ | ⋮ |

FIG.9

| ID | SESSION ID | UTTERER TYPE 0:MANAGER 1:USER | UTTERED CONTENTS | UTTERANCE TYPE ID CATEGORY: 5-0 Q-A,5-1 SCENARIO: 5-2 | CONTENTS ID | DATE AND TIME |
|---|---|---|---|---|---|---|
| 4-1 | zeta/Guest/36c2a9cc-6258-4276-ab0d-d2b739ac65a3 | 0 | ANY QUESTIONS? ENTER A QUESTION DIRECTLY, OR SELECT SEARCHING WITH BUTTONS. | 5-2 | 6-1 | 2018-03-30 T14:01:29.3 |
| 4-2 | zeta/Guest/36c2a9cc-6258-4276-ab0d-d2b739ac65a3 | 1 | WHAT TO DO UPON CHILDBIRTH | — | — | 2018-03-30 T14:03:31.1 |
| 4-3 | zeta/Guest/36c2a9cc-6258-4276-ab0d-d2b739ac65a3 | 0 | HERE IS THE ANSWER TO "LIST OF PROCEDURE REQUIRED UPON CHILDBIRTH" CHILDBIRTH OF EMPLOYEE OR SPOUSE NEEDS THE FOLLOWING APPLICATIONS: 1. CHANGE IN FAMILY MEMBERS 2. GIFT MONEY 3. HEALTH INSURANCE, MEMBER CHANGE 4. HEALTH INSURANCE, GIFT MONEY 5. STOP OF COMMUTATION ALLOWANCE | 5-1 | 1-11 | 2018-03-30 T14:03:31.7 |
| 4-4 | zeta/Guest/36c2a9cc-6258-4276-ab0d-d2b739ac65a3 | 0 | IS THE QUESTION SOLVED WITH THE CURRENT ANSWER? PLEASE ENTER YES OR NO TO COMPLETE THE SESSION. | 5-2 | 6-3 | 2018-03-30 T14:03:32.4 |
| 4-5 | zeta/Guest/36c2a9cc-6258-4276-ab0d-d2b739ac65a3 | 1 | YES | 5-2 | 6-4 | 2018-03-30 T14:03:35.6 |
| 4-6 | zeta/Guest/36c2a9cc-6258-4276-ab0d-d2b739ac65a3 | 0 | THANK YOU. | 5-2 | 6-6 | 2018-03-30 T14:03:36.3 |
| 4-7 | zeta/Guest/36c2a9cc-6258-4276-ab0d-d2b739ac65a3 | 0 | ANY QUESTIONS? ENTER A QUESTION DIRECTLY, OR SELECT SEARCHING WITH BUTTONS. | 5-2 | 6-1 | 2018-03-30 T14:03:38.3 |
| 4-8 | zeta/Guest/36c2a9cc-6258-4276-ab0d-d2b739ac65a3 | 1 | APPLICATION OF GIFT MONEY ON CHILDBIRTH | — | — | 2018-03-30 T14:06:53.1 |
| 4-9 | zeta/Guest/36c2a9cc-6258-4276-ab0d-d2b739ac65a3 | 0 | THERE ARE SEVERAL CANDIDATES. IS THERE AN ANSWER? LIST OF PROCEDURE REQUIRED UPON CHILDBIRTH GIFT MONEY ON CHILDBIRTH  NOT FOUND IN THESE | 5-1 | 1-13 | 2018-03-30 T14:06:53.8 |
| 4-10 | zeta/Guest/36c2a9cc-6258-4276-ab0d-d2b739ac65a3 | 1 | GIFT MONEY ON CHILDBIRTH | — | — | 2018-03-30 T14:08:56.5 |
| 4-11 | zeta/Guest/36c2a9cc-6258-4276-ab0d-d2b739ac65a3 | 0 | UPON CHILDBIRTH OF EMPLOYEE OR SPOUSE, GIFT MONEY, COST SUPPORT, AND HOLIDAYS ARE GRANTED. | 5-1 | 1-12 | 2018-03-30 T14:08:56.9 |
| 4-12 | zeta/Guest/36c2a9cc-6258-4276-ab0d-d2b739ac65a3 | 0 | IS THE QUESTION SOLVED WITH THE CURRENT ANSWER? PLEASE ENTER YES OR NO TO COMPLETE THE SESSION. | 5-2 | 6-3 | 2018-03-30 T14:08:57.4 |
| 4-13 | zeta/Guest/36c2a9cc-6258-4276-ab0d-d2b739ac65a3 | 1 | NO | 5-2 | 6-5 | 2018-03-30 T14:09:32.5 |
| 4-14 | zeta/Guest/36c2a9cc-6258-4276-ab0d-d2b739ac65a3 | 0 | SORRY. CONTACT THE SUPPORT COUNTER, OR CHANGE THE METHOD AND WORDS TO RUN A SEARCH AGAIN. (FEEDBACK[NO]) | 5-2 | 6-7 | 2018-03-30 T14:09:32.9 |

FIG.19

TENANT ID = 001  _1811

| KEYWORD | TAG TYPE | PAGE TYPE | SCORE |
|---|---|---|---|
| SOLUTION | <title> | ITEM | 10 |
| | <h1> | ITEM | 8 |
| | <h1> | FAQ | 5 |
| | <h1><p> | ITEM | 4 |
| | <h1><p> | FAQ | 2 |
| | <h2> | ITEM | 6 |
| | <h2> | FAQ | 3 |
| | <h2><p> | ITEM | 3 |
| | <h2><p> | FAQ | 1 |
| | ... | ... | ... |
| IS IT | <title> | – | – |
| | <h1> | FAQ | 10 |
| | <h1><p> | FAQ | 6 |
| | <h2> | FAQ | 8 |
| | <h2><p> | FAQ | 6 |
| | ... | ... | ... |
| ... | ... | ... | ... |

FIG.20

TENANT ID = 001 — 1812

| PAGE TYPE | DISPLAY OR HIDE | SCENARIO ID | CATEGORY ID | FAQ MASTER ID | SYNONYM ID |
|---|---|---|---|---|---|
| ITEM | DISPLAY | 01 SELECT FROM AMONG RECOMMENDED ITEMS<br>02 SELECT FROM AMONG FAQ | 01 ITEM | 01 ITEM | 01 ITEM |
| NEW GRADUATE HIRING | DISPLAY | 02 SELECT FROM AMONG FAQ<br>03 SEE APPLICATION REQUIREMENTS | 01 ITEM<br>02 HIRING | 01 ITEM<br>02 HIRING | 01 ITEM<br>02 HIRING |
| CAREER HIRING | DISPLAY | 02 SELECT FROM AMONG FAQ<br>04 SEE HIRING SCHEDULE | 01 ITEM<br>02 HIRING | 01 ITEM<br>02 HIRING | 01 ITEM<br>02 HIRING |
| FAQ | HIDE | — | — | — | — |

```
<html>
  <head>
    :
    <title>SOLUTION SERVICE</title>
    :
  </head>
  <body>
    :
    <h1>OFFICE SOLUTION</h1>
    <p>LET ME INTRODUCE OFFICE SOLUTION </p>
    <h2>MEETING SOLUTION</h2>
    <p>FEEL FREE TO COMMUNICATE···</p>
    <h2>SOLUTION FOR ACCOUNTING WORK</h2>
    <p>ANY TROUBLE IN ACCOUNTING WORK?···</p>
    :
  </body>
<html>
```

2201

| PAGE TYPE | TOTAL SCORE |
|---|---|
| ITEM | 34 |
| FAQ | 14 |

| TENANT ID = 001 | | 1813 |
|---|---|---|
| HOME PAGE URL: https://xxx/ | | |
| | URL | PAGE TYPE |
| | /product/ | ITEM |
| | /jobs/newgraduate/ | NEW GRADUATE HIRING |
| | /jobs/careers/ | CAREER HIRING |
| | /faq/ | FAQ |
| | ... | ... | ated on Oct. 28, 2020, the entire contents of which are hereby incorporated by reference.

INFORMATION PROCESSING APPARATUS, INFORMATION PROCESSING SYSTEM, INFORMATION PROCESSING METHOD, AND PROGRAM

CROSS-REFERENCE TO RELATED APPLICATIONS

The present application claims priority under 35 U.S.C. § 119 of Japanese Patent Application No. 2019-217424 filed on Nov. 29, 2019, and Japanese Patent Application No. 2020-180718 filed on Oct. 28, 2020, the entire contents of which are hereby incorporated by reference.

BACKGROUND OF THE INVENTION

1. Field of the Invention

The present disclosure relates to an information processing apparatus, an information processing system, an information processing method, and a program.

2. Description of the Related Art

Conventionally, so-called chatbots (in some cases, simply referred to as "bots" or the like) have been known, in which a device such as a computer first executes pattern recognition of text, sound, images, or the like input by a user via a network; next, the device such as a computer responds to a talk or a question made by the user, and controls the device, based on a result of the pattern recognition.

For example, in order to assist an editor in editing work of a dialog scenario used in a chatbot, a method of displaying information that indicates which and to what extent branches in the dialog scenario have been selected, in forms of letters, diagrams, and the like, has been known. Also, it has been known that the assisting method as such allows the editor to browse information corresponding to the branches (options) at a glance when editing the dialog scenario that varies depending on the flow (see, for example, Patent Document 1, etc.).

However, in the conventional methods, in order to cause a bot to operate on multiple pages on a site constituted with the multiple pages, the bot needs to be installed on each page separately, or the single bot needs to be installed for the entire site. In the former case, a lot of time and effort need to be taken for management caused by the management of the bots installed on the respective pages. Meanwhile, in the latter case, the user may need to take the time and effort to reach an answer desirable for the user. In other words, it is often the case that the convenient is low upon using the bot.

RELATED ART DOCUMENTS

Patent Documents

Patent Document 1: Japanese Laid-Open Patent Application No. 2018-195298

SUMMARY OF THE INVENTION

According to one aspect in the present disclosure, an information processing apparatus connected to a user terminal that receives input from a user, includes a memory; and a processor. The processor is configured to execute obtaining input information input into the user terminal; searching for response information corresponding to the input information; responding to the user terminal with a response message based on the response information corresponding to the input information; obtaining an access target to be accessed by the user terminal in order for the user terminal to receive the input of the input information by the user; and changing the search by the searching or a response by the responding based on the access target.

BRIEF DESCRIPTION OF DRAWINGS

Other objects and further features of embodiments will be apparent from the following detailed description when read in conjunction with the accompanying drawings, in which:

FIG. 6 is a diagram illustrating an example of category information according to an embodiment;

FIG. 7 is a diagram illustrating an example of question-and-answer information according to an embodiment;

FIG. 8 is a diagram illustrating an example of query history information according to an embodiment;

FIG. 9 is a diagram illustrating an example of dialog history information according to an embodiment;

FIG. 19 is a diagram illustrating an example of a calculation table according to the second embodiment;

FIG. 20 is a diagram illustrating an example of a setting information table according to the second embodiment;

FIG. 22 is a diagram illustrating an example of a code of a page according to the second embodiment; and FIG. 23 is a diagram illustrating an example of a page type table according to a second embodiment.

DETAILED DESCRIPTION OF THE EMBODIMENTS

<Example of Overall Configuration>

According to one aspect in the present disclosure, it is possible to improve the convenience upon using a bot.

Figure 1:
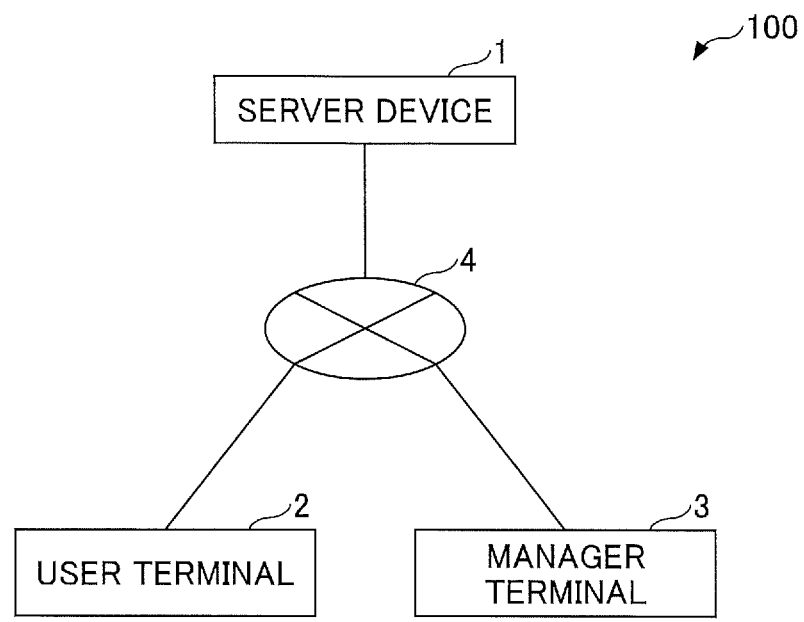
FIG. 1 is a diagram illustrating an example of an overall configuration of a chatbot system according to an embodiment.

FIG. 1 is a diagram illustrating an example of the overall configuration of a chatbot system according to an embodiment. For example, a chatbot system 100 as an example of an information processing system has a system configuration that includes a server device 1, a user terminal 2, and the like. Note that as illustrated in the figure, the chatbot system 100 may further include a device other the server device 1 and the user terminal 2, such as a manager terminal 3.

The server device 1 is an example of an information processing apparatus that provides a chatbot service.

The user terminal 2 is an information processing apparatus on which the user performs an operation such as entering a question into the chatbot service. Note that multiple user terminal 2 may be connected. Also, the user terminal 2 does not need to be connected all the time.

The manager terminal 3 is an information processing apparatus on which the administrator or the like performs an operation such as inputting or the like in order to manage the server device 1 and the like.

The server device 1, the user terminal 2, and the manager terminal 3 are connected to each other via a communication network 4 or the like.

For example, the communication network 4 is the Internet or the like. Alternatively, the communication network 4 may be a local area network (LAN), a wide area network (WAN), a short-distance communication network, or a communication network that is a combination of these.

The server device 1 communicates with the user terminal 2, the manager terminal 3, and the like. For example, the server device 1 provides a so-called chatbot service or the like that responds to input information representing a question or the like input by a user, with an response message that serves as an answer or the like.

Also, the server device 1 provides services such as a so-called chat and the like, to transmit and receive messages between multiple users. In other words, the server device 1 provides an instant messaging service or the like. Note that various services may be provided on multiple information processing apparatuses. In the following, examples will be described in which the server device 1 as the single device provides the services.

In the chatbot service, when a user enters characters or a string representing a question or the like into the user terminal 2 (hereafter, referred to as the "input information"), the server device 1 obtains the input information from the user terminal 2 via the communication network 4 or the like. Next, the server device 1 searches for information that serves as an answer or the like to a question indicated by the input information (hereafter, referred to as the "response information"). Then, the server device 1 generates a response message based on the response information corresponding to the input information, to respond with the message to the user terminal 2 through the communication network 4 or the like. As a result, on the user terminal 2, the response information corresponding to the input information is displayed for the user in a form of a message or the like. In this way, the user uses the chatbot service to obtain an answer to a question.

Specifically, devices and databases used for implementing the chatbot service have a hardware configuration and a data configuration, for example, as follows.

<Example of User Terminal>

Figure 2:
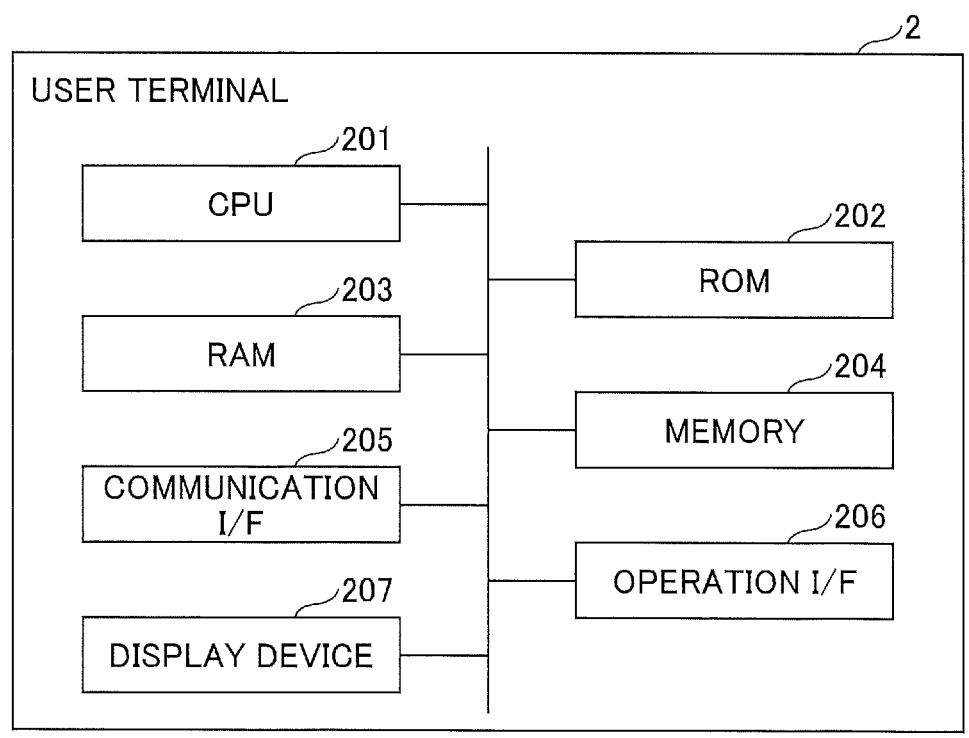
FIG. 2 is a diagram illustrating an example of a hardware configuration of a user terminal according to an embodiment.

FIG. 2 is a diagram illustrating an example of a hardware configuration of a user terminal according to an embodiment. The user terminal 2 has a hardware configuration that includes, for example, a CPU (CPU) 201, a ROM (Read-Only Memory) 202, a RAM (Random Access Memory) 203, a memory 204, a communication I/F 205, an operation I/F 206, and a display device 207. Also, the hardware components included in the user terminal 2 are connected to each other, for example, by a bus or the like. Note that the hardware components included in the user terminal 2 may be connected to the other devices and the like by wired or wireless communication.

The user terminal 2 is an information processing apparatus, for example, a PC (Personal Computer), a smartphone, a tablet, or the like.

The CPU 201 implements functions of an arithmetic/logic unit, a control unit, and the like. Also, the CPU 201 is an example of a control device and an arithmetic/logic device.

The ROM 202 is a storage device made of a non-volatile semiconductor, or the like.

The RAM 203 is a storage device made of a volatile semiconductor, or the like.

The memory 204 is an example of a main memory device. For example, the memory 204 stores information obtained via the communication network 4. Note that the user terminal 2 may further include an auxiliary storage device such as a hard disk or an SSD (Solid State Drive). Also, the ROM 202, the RAM 203, the memory 204, and the like implement memory functions. Note that the ROM 202 or the RAM 203 may be included in the memory 204.

The communication I/F 205 implements functions of a communication unit and the like. For example, the communication I/F 205 is constituted with connecting terminals and communication circuits.

The operation I/F 206 implements functions of an input unit and the like. For example, the operation I/F 206 is constituted with input devices such as buttons, a keyboard, a dial, keys, a touch panel, a microphone, and the like.

The display device 207 implements functions of an output unit. For example, the display device 207 is an output device made of a liquid crystal panel, an organic EL (Electroluminescence) device, an inorganic EL device, or the like. Note that the display device 207 and the operation I/F 206 may be formed to be integrated like a touch panel.

Note that a program may be stored in the ROM 202 and the memory 204, or instead, for example, in an auxiliary storage device or the like. Also, a program may be obtained via a network or the like.

<Example of Manager Terminal>

Figure 3:
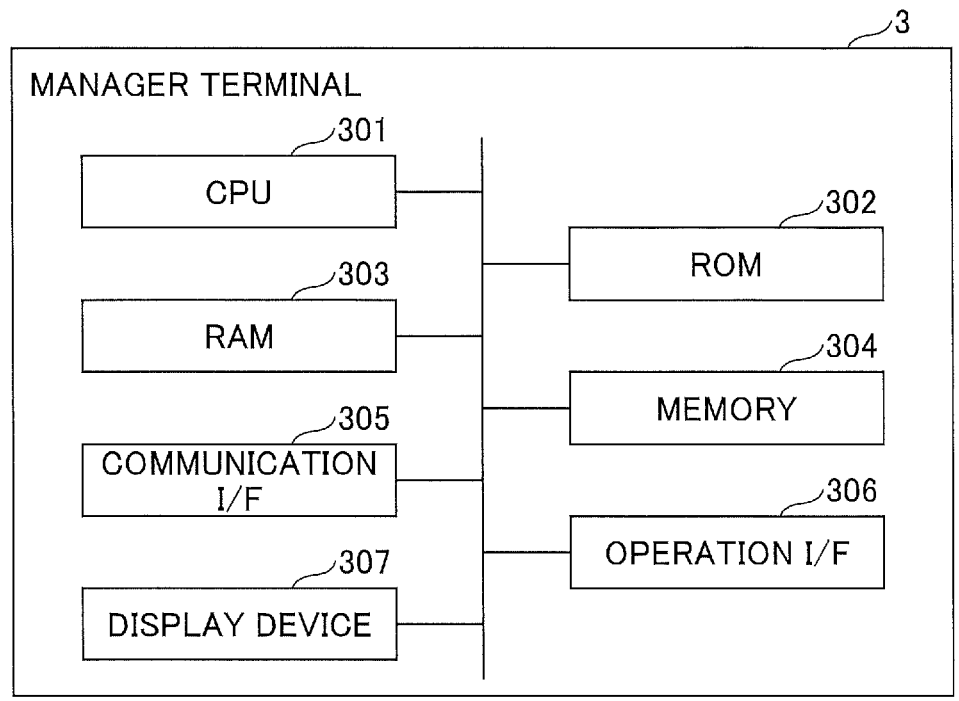
FIG. 3 is a diagram illustrating an example of a hardware configuration of a manager terminal according to an embodiment.

FIG. 3 is a diagram illustrating an example of a hardware configuration of a manager terminal according to an embodiment. For example, the manager terminal 3 has a hardware configuration that includes a CPU 301, a ROM 302, a RAM 303, a memory 304, a communication I/F 305, an operation I/F 306, and a display device 307. In the following, examples will be described in which the manager terminal 3 has the same hardware configuration as the user terminal 2, to omit duplicated descriptions. For example, the CPU 301, the ROM 302, the RAM 303, the memory 304, the communication I/F 305, the operation I/F 306, and the display device 307 are substantially the same as the CPU 201, the ROM 202, the RAM 203, the memory 204, the communication I/F 205, the operation I/F 206, and the display device 207 described above, and hence, the description is omitted here. Alternatively, the manager terminal 3 may have a hardware configuration different from those of the user terminal 2, the server device 1, and the like.

<Example of Server Device>

Figure 4:
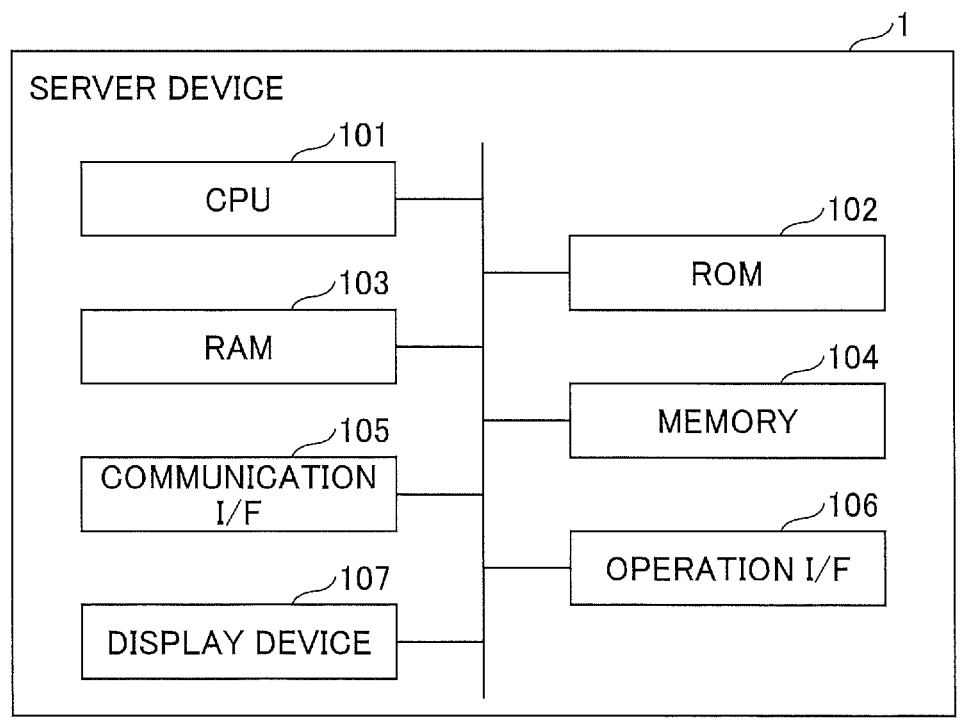
FIG. 4 is a diagram illustrating an example of a hardware configuration of a server device according to an embodiment.

FIG. 4 is a diagram illustrating an example of a hardware configuration of a server device according to an embodiment. For example, the server device 1 has a hardware configuration that includes a CPU 101, a ROM 102, a RAM 103, a memory 104, a communication I/F 105, an operation I/F 106, and a display device 107. In the following, examples will be described in which the server device 1 has the same hardware configuration as the user terminal 2, to omit duplicated descriptions. For example, the CPU 101, the ROM 102, the RAM 103, the memory 104, the communication I/F 105, the operation I/F 106, and the display device 107 are substantially the same as the CPU 201, the ROM 202, the RAM 203, the memory 204, the communication I/F 205, the operation I/F 206, and the display device 207 described above, and hence, the description is omitted here. Alternatively, the server device 1 may have a hardware configuration different from those of the user terminal 2, the manager terminal 3, and the like.

<Examples of Databases (Hereafter, Referred to as "DBs")>

In the case of providing the chatbot service on the chatbot system 100, the following DBs are built in the server device 1 in advance. In the following, examples of databases will be described in the case where the server device 1 has a keyword DB, a synonym DB, a dialog scenario DB, a category DB, a question-and-answer DB, a question history DB, a dialog history DB, and a contract information DB.

The keyword DB stores strings or so-called keywords indicating features of questions and answers. Note that a keyword may be a word, a phrase, or a sentence. Also, the keyword DB may store keywords related to matters other than question-and-answer information.

For example, first, the server device 1 decomposes a string that constitutes a question into words. Next, the server device 1 collates each of the words with words stored in the keyword DB, to search for a keyword of the question. Next, the server device 1 searches for a word that matches a keyword from among strings of "questions" in the question-and-answer DB, to search for the question-and-answer information corresponding to the question. In this way, the keyword DB is used for extracting keywords indicated by the question.

The synonym DB stores information on synonyms of the keywords and the like. For example, the information on synonyms is information that associates strings having similar meanings to each other. Note that the string may be a word, a phrase, or a sentence. Also, strings having similar meanings are not strictly limited to strings having similar meanings. For example, the strings having similar meanings to each other may include strings that can be inferred from one to another, a string as part of another string, or strings that are used in similar situations. Also, the information on synonyms may be defined discretionarily depending on the use environment.

First, the server device 1 decomposes a string constituting a question indicated by the input information into words. Next, the server device 1 collates each of the words with words stored in the synonym DB, to extract synonyms. In this way, the server device 1 collates the words and the synonyms of the words included in the question in the keyword DB and the like, to estimate the keywords of the question.

The dialog scenario DB stores scenario information for implementing dialogs according to the input information. For example, the scenario information is generated so that a user dialog proceeds along a scenario input into the dialog scenario DB in advance.

Figure 5:
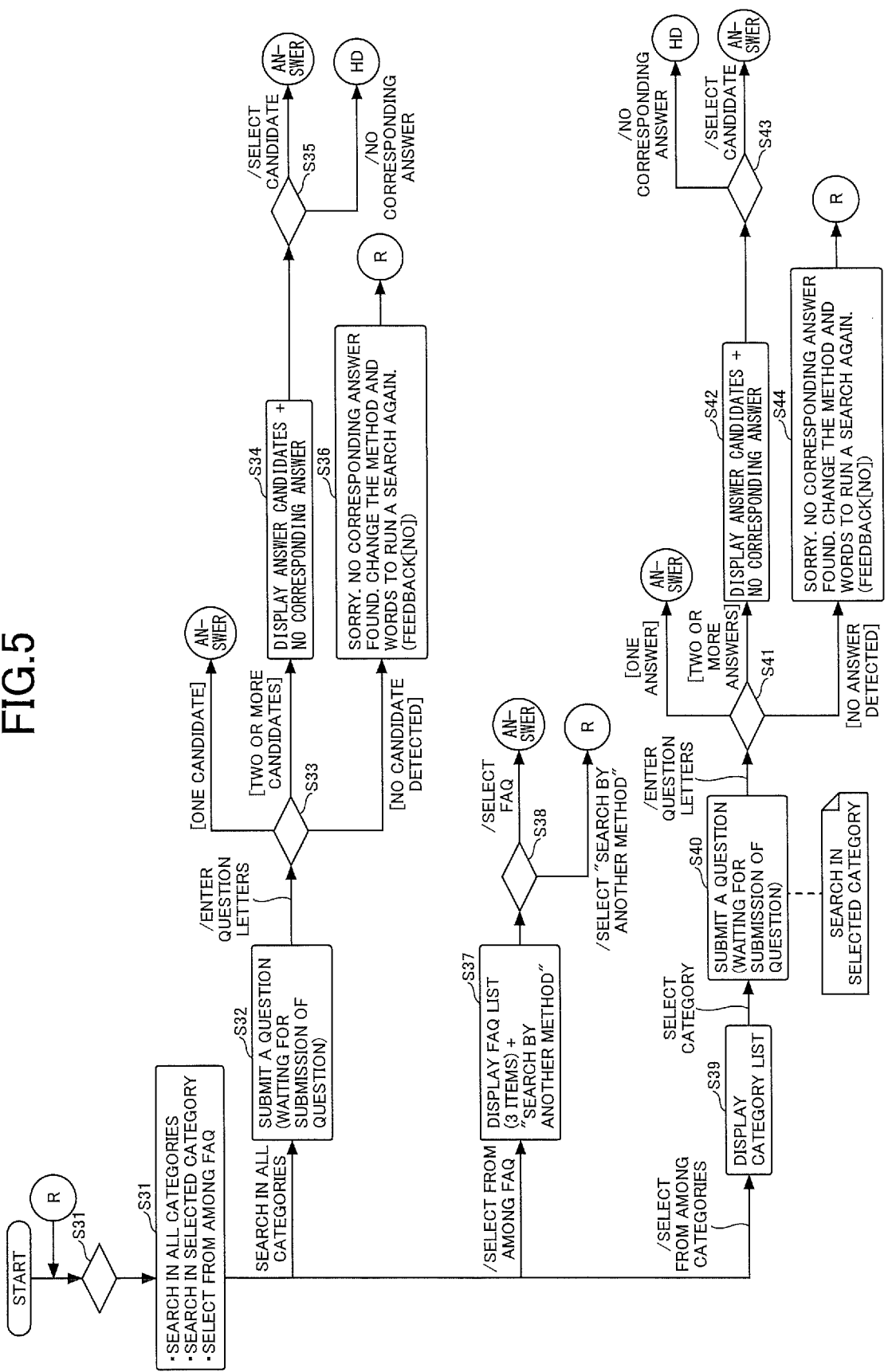
FIG. 5 is a diagram illustrating an example of a flow of a dialog based on scenario information according to an embodiment.

FIG. 5 is a diagram illustrating an example of a flow of a dialog based on scenario information. For example, in response to receiving the input information on a question made by the user, a flow of responding to the question with a response message serving as the answer to the question is assumed to proceed according to the scenario information as follows.

<Example of Flow of Dialog Based on Scenario Information>

For example, in the chatbot system, scenario information is input in advance by the administrator so that the dialog proceeds with a flow as illustrated in the figure. Then, the chatbot system executes a dialog with the user based on the scenario information. Specifically, in the chatbot system, the scenario information, databases, GUIs, and the like are set in advance so as to be capable of communicating with the user following the flow as illustrated in the figure. In the following, the flow will be described in detail.

At Step S31, first, the chatbot system displays a selection menu on the user terminal 2, which lists search methods available for a question. For example, the selection menu is a GUI to receive an operation to be selected by the user from among three options of "search in all categories", "search in selected categories", and "select from among FAQ". Note that the selection menu may display four or more options or two or fewer options.

If "search in all categories" is selected on the selection menu (corresponding to "search in all categories" in the figure), the chatbot system proceeds to Step S32. Alternatively, if "select from among FAQ" is selected on the selection menu (corresponding to "select from among FAQ" in the figure), the chatbot system proceeds to Step S37. As the other option, if "search in selected categories" is selected on the selection menu (corresponding to "search in selected categories" in the figure), the chatbot system proceeds to Step S39.

At Step S32, the chatbot system causes the user terminal 2 to display a message prompting the user to enter a question by characters. Also, the chatbot system displays a GUI of a text box or the like on the user terminal 2, to receive an operation of entering characters as a question. Next, once a question is entered (corresponding to "enter question letters" in the figure), the chatbot system proceeds to Step S33.

At Step S33, the chatbot system parses the string presenting the question. Then, the chatbot system searches in the question-and-answer DB to extract candidates that can serve as an answer to the question (hereafter, simply referred to as "candidates"). Note that the chatbot system may obtain multiple candidates as a result of the search.

As a result of the search executed at Step S33, if there is one candidate (corresponding to "one candidate" in the figure), the chatbot system responds with the searched candidate as the response information. Also, as a result of the search executed at Step S33, if there are two or more candidates (corresponding to "two or more candidates" in the figure), the chatbot system proceeds to Step S34. Alternatively, if no candidate is detected as a result of the search at Step S33 (corresponding to "no candidate detected" in the figure), the chatbot system proceeds to Step S36.

At Step S34, the chatbot system displays a GUI on the user terminal 2 to cause the user to perform one of the operations from among an operation to select one of the multiple candidates, and an operation to select none of the candidates.

At Step S35, in response to receiving the operation to select one of the multiple candidates (corresponding to "select candidate" in the figure), the chatbot system responds with the selected candidate as the response information. On the other hand, in response to receiving the operation to select none of the candidates (corresponding to "no corresponding answer" in the figure), the chatbot system displays a message of apology on the user terminal 2 that expresses, for example, that an answer to the question cannot be displayed at the current stage.

At Step S36, the chatbot system displays a message of apology and a message of prompting a re-search on the user terminal 2, and returns to Step S31.

At Step S37, the chatbot system extracts one or more questions (e.g., around three) that are frequently queried from other users and the like with reference to the question history DB. Then, the chatbot system lists the questions and displays the list on the user terminal 2. Further, the chatbot system displays a GUI on the user terminal 2 prompting the user to select another search method.

At Step S38, if a question is selected (corresponding to "select FAQ" in the figure), the chatbot system responds with an answer to the selected question obtained as a result of search in the question-and-answer DB, as the response information. On the other hand, if another search method is selected at Step S38 (corresponding to "select "search by another method"" in the figure), the chatbot system returns to Step S31.

At Step S39, the chatbot system lists the category names and displays the list on the user terminal 2. Then, in response to an operation executed to select a category in the list of category names (corresponding to "select category" in the figure), the chatbot system proceeds to Step S40.

At Step S40, the chatbot system receives an operation of entering characters as a question. Next, if a question is entered (corresponding to "enter question letters" in the figure), the chatbot system obtains the input information representing the question. Then, the chatbot system proceeds to Step S41.

At Step S41, the chatbot system searches in the question-and-answer DB to extract candidates. Next, if there is one candidate (corresponding to "one answer" in the figure), the chatbot system responds with the searched candidate as the response information. Also, if there are two or more candidates (corresponding to "two or more answers" in the figure), the chatbot system proceeds to Step S42. Alternatively, if no candidate can be detected (corresponding to "no answer detected" in the figure), the chatbot system proceeds to Step S44.

At Step S42, the chatbot system displays a GUI on the user terminal 2 to cause the user to perform one of the operations from among an operation to select one of the multiple candidates, and an operation to select none of the candidates.

At Step S43, in response to receiving the operation to select one of the multiple candidates (corresponding to "select candidate" in the figure), the chatbot system responds with the selected candidate as the response information. On the other hand, in response to receiving the operation to select none of the candidates (corresponding to "no corresponding answer" in the figure), the chatbot system displays a message of apology on the user terminal 2 that expresses, for example, that an answer to the question cannot be displayed at the current stage.

At Step S44, the chatbot system displays a message of apology and a message of prompting a re-search on the user terminal 2, and returns to Step S31.

The scenario information is input assuming, for example, the flow of a dialog as described above. In other words, the scenario information indicates the types of GUIs to be used in the flow of a dialog, and a result of settings set by the administrator in terms of the order to output messages, GUIs, and the like.

The category DB stores category information for classifying questions. For example, the category information is information as follows.

FIG. 6 is a diagram illustrating an example of category information according to an embodiment. For example, as illustrated in the figure, the category information is information constituted with data fields of "ID", "category name", and "update date and time".

The "category name" represents a category under which a question is classified.

The "ID" represents an ID (Identification), namely, identification information of each category.

The "update date and time" represents the date and time when each record of the information was updated.

The question-and-answer DB stores information that associates a question with an answer to the question (hereafter, referred to as the "question-and-answer information"). For example, the question-and-answer information is generated in advance by the administrator and stored in the question-and-answer DB. For example, the question-and-answer information is information as follows.

FIG. 7 is a diagram illustrating an example of question-and-answer information according to an embodiment. For example, as illustrated in the figure, the question-and-answer information is information constituted with data fields of "ID", "question", "similar question", "answer", "category ID", and "update date and time".

The "ID" represents an ID, namely, identification information of each record in the question-and-answer information.

The "question" represents contents of the question.

The "similar question" represents a question that has contents similar to that of the question set in the "question".

The "answer" represents an answer to the question.

The "category ID" represents the ID of a category with which the category corresponding to the question can be identified.

The "update date and time" represents the date and time when each record of the information was updated.

The question history DB stores information representing questions previously input by the users (hereafter, referred to as the "query history information"). For example, the query history information is information as follows.

FIG. 8 is a diagram illustrating an example of query history information according to an embodiment. As illustrated in the figure, the query history information is information constituted with data fields of "ID", "session ID", "category ID associated with hit question", "hit question ID", "user input", "feedback", and "date and time".

The "ID" represents an ID, namely, identification information of each record in the query history information.

The "session ID" represents identification information with which a dialog session in which the question was made can be identified.

The "category ID associated with hit question" represents the ID of a category with which the category corresponding to the question can be identified.

The "hit question ID" represents the ID of a question.

The "user input" represents a question input by a user.

The "feedback" represents whether the user has provided feedback to the answer to the question.

The "date and time" represents the date and time when the dialog was executed.

A dialog session is a set of dialogs exchanged between the user terminal 2 and the server device 1. For example, dialogs in the same dialog session includes a dialog that was executed after a screen used for the dialog in a chat format or the like was opened until it was closed; a dialog that was executed after the screen was opened until it was forcibly closed due to the session timeout; and the like, on the user terminal 2.

Note that a session timeout occurs when no action is taken on the user terminal 2 within a predetermined time set in advance. Then, the session timeout is a process of closing the screen used for a dialog.

Note that the dialog session is not limited to the above examples. For example, a dialog session may start with inputting a question, to which an answer is given, and then, end with input of feedback by the user. In this case, the dialog session completes when the feedback is received from the user.

The dialog history DB stores information that represents a history of dialogs exchanged between the user terminal 2 and the server device 2, which includes uttered contents input on the user terminal 2 and contents output by the server device 1 (hereafter, referred to as the "dialog history information"). For example, the dialog history information is information as follows.

FIG. 9 is a diagram illustrating an example of dialog history information according to an embodiment. As illustrated in the figure, the dialog history information is information constituted with data fields of "ID", "session ID", "utterer type", "uttered contents", "utterance type ID", "contents ID" and "date and time".

The "ID" represents an ID, namely, identification information of each record in the dialog history information.

The "session ID" represents an ID with which a dialog session in which a dialog was executed can be identified.

The "utterer type" represents the type of utterer. Specifically, the "utterer type" is set with either "0" or "1"; "0" represents an utterance made by the manager or administrator, whereas "1" represents an utterance made by the user.

The "uttered contents" represents contents that were uttered.

The "utterance type ID" is set as, for example, "5-0", "5-1", or "5-2". Then, based on these settings, the "utterance type ID" indicates which one of the types among "category", "question-and-answer information", and "scenario" corresponds to the "uttered contents".

In the case where the utterance type ID corresponds to the scenario, the "contents ID" represents an utterance set in a scenario. Also, in the case where the utterance type ID corresponds to the scenario, the "contents ID" represents an ID in the question-and-answer information. Further, in the case where the utterance type ID corresponds to the category, the "contents ID" represents an utterance to select a category.

The "date and time" represents the date and time when the dialog was executed.

The contract information DB stores contents of contracts concluded in advance with users. For example, a contract is set in advance in terms of whether to be supported with service personnel, information on a period during which the support is available, and the like. Also, the server device 1 may hold information on the obtained contract in association with a tenant ID and the like.

Note that the types and configurations of DBs are not limited to the above examples. In other words, the DBs may have other formats. Also, the DBs may be configured with distributed data held on multiple devices. Further, each of the DBs is not necessarily indispensable. In other words, as long as data items necessary for making a scenario are available, the formats of DBs do not matter.

First Embodiment

<Function Block Diagram>

Figure 10:
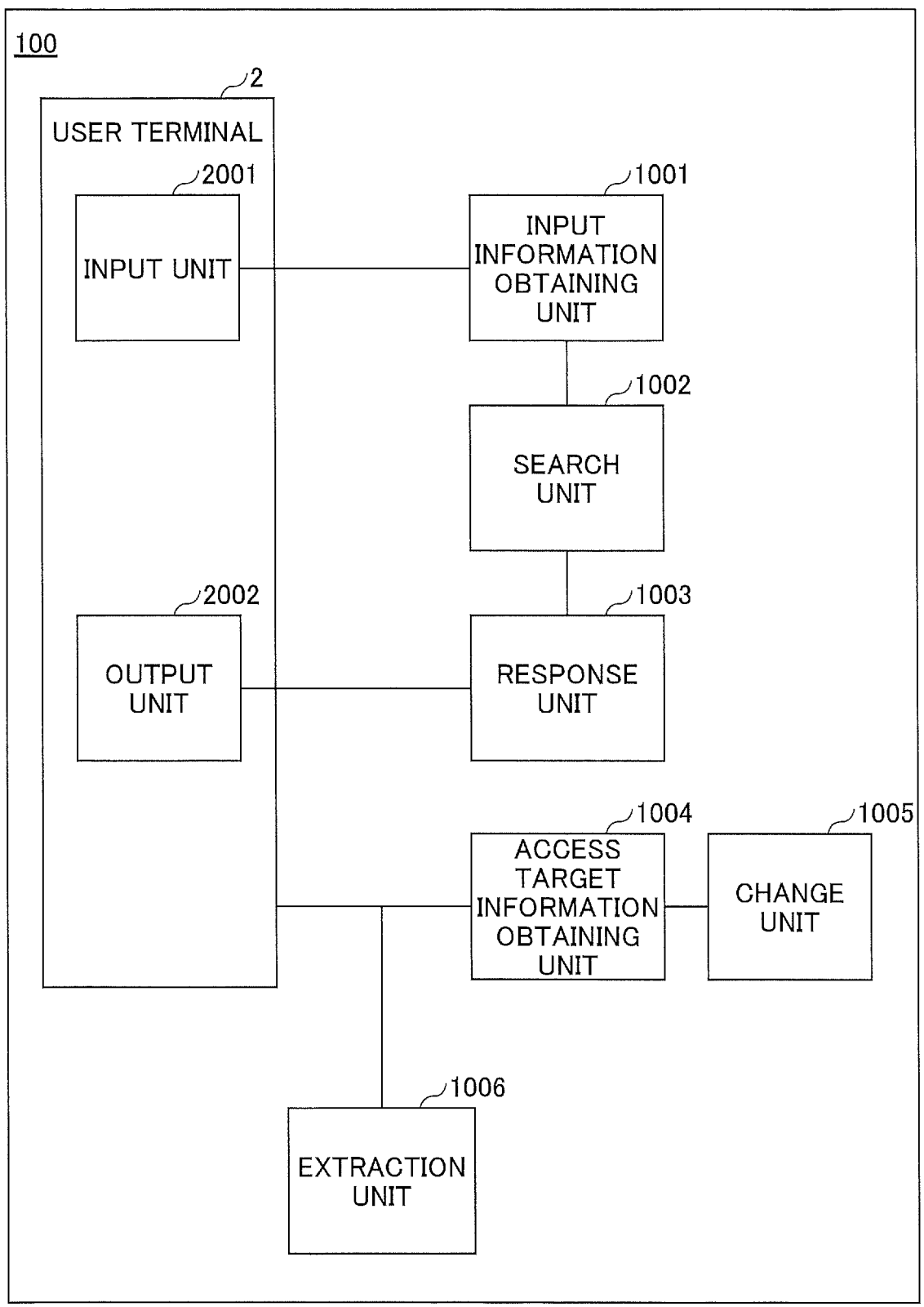
FIG. 10 is a diagram illustrating an example of a functional configuration of a chatbot system according to a first embodiment.

FIG. 10 is a diagram illustrating an example of a functional configuration of a chatbot system 100 according to a first embodiment. For example, it is desirable that the chatbot system 100 has a functional configuration that includes an input information obtaining unit 1001, a search unit 1002, a response unit 1003, an access target information obtaining unit 1004, a change unit 1005, and a extraction unit 1006. The functional units described above are implemented by, for example, a program executed by the CPU 101 provided on the server device 1. Note that at least some of the functional units described above may be implemented by hardware.

The input information obtaining unit 1001 executes a procedure of obtaining input information input on the user terminal 2.

The search unit 1002 executes a procedure of searching for response information corresponding to the input information.

The response unit 1003 executes a procedure of responding to the user terminal 2 with the response information corresponding to the input information.

By the input information obtaining unit 1001, the search unit 1002, and the response unit 1003, the response information corresponding to the input information input through an input unit 2001 is output to an output unit 2002 to make a response, and thereby, a dialog, namely, a bot is implemented.

For example, the input information obtaining unit 1001 obtains input information from the user terminal 2 through the communication I/F 105 or the like. Also, the search unit 1002 searches for response information corresponding to the input information by, for example, the CPU 101 and the like. Further, the response unit 1003 responds with the response information via the communication I/F 105 or the like.

The access target information obtaining unit 1004 executes a procedure of obtaining information on an access target accessed by the user terminal 2. For example, the access target information obtaining unit 1004 obtains the access target of the user terminal 2 via the communication I/F 105 or the like.

The change unit 1005 executes a procedure of changing the range of a search by the search unit 1002 or a response by the response unit 1003 based on the access target. For example, the change unit 1005 changes the search or response by the CPU 101 and the like.

The extraction unit 1006 executes a procedure of extracting keywords of contents presented on a page accessed by the user terminal 2, or synonyms of the keywords. For example, the extraction unit 1006 extracts keywords or synonyms when the access target information obtaining unit 1004 obtains the access target by the CPU 101 and the like.

Note that the server device 1 may further include functions of an arithmetic/logic unit and a control unit implemented by a program or the like executed by the CPU 101. Alternatively, the server device 1 may further include functions of an input unit, an output unit, a storage unit, a communication unit, and the like. Further, the user terminal 2 may include functions of an arithmetic/logic unit, a control unit, a storage unit, an input unit, an output unit, and a communication unit, and the like.

<Example of Overall Processing>

Figure 11:
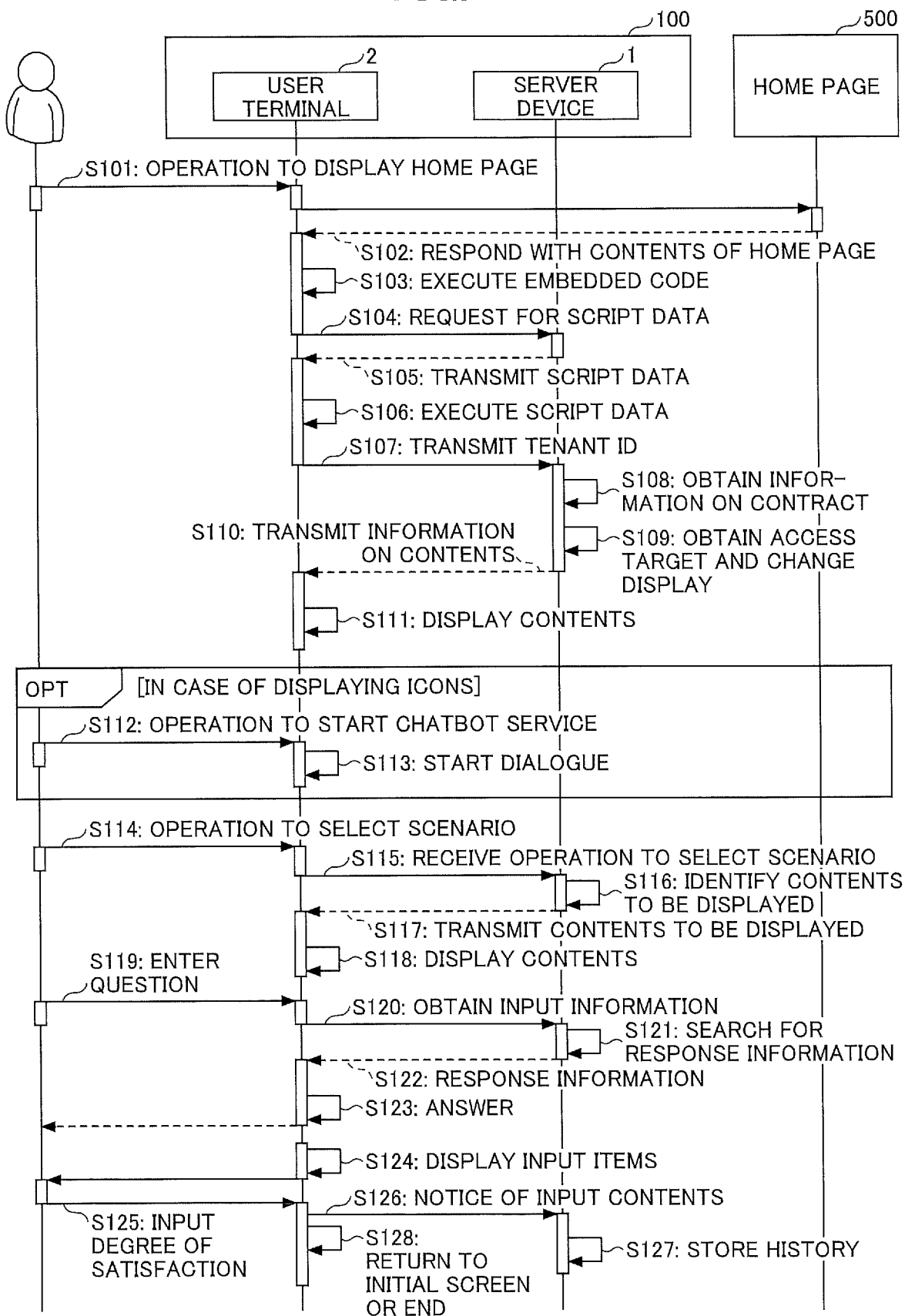
FIG. 11 is a diagram illustrating an example of overall processing executed by the chatbot system according to the first embodiment.

FIG. 11 is a diagram illustrating an example of the overall processing executed by the chatbot system 100 according to the first embodiment. In the following, an example will be described where the server device 1 as a single server implements the chatbot service.

At Step S101, the input unit 2001 of the user terminal 2 receives an operation to activate the chatbot. For example, the input unit 2001 of the user terminal 2 receives an operation of pressing a predetermined icon included in a web page to be displayed; an operation to start a dialog application installed on the user terminal 2; or an operation of pressing a predetermined button for the dialog application.

At Step S102, a home page 500 responds to a chatbot activation request, and replies to the user terminal 2. Specifically, the home page 500 has an embedded code embedded in advance in the source code of the home page. Then, at Step S102, the user terminal 2 becomes ready for execution of processing based on the embedded code.

At Step S103, the arithmetic/logic unit of the user terminal 2 executes the embedded code.

At Step S104, the communication unit of the user terminal 2 makes a request for script data generated by JavaScript (registered trademark) or the like based on the embedded code.

At Step S105, the communication unit of the server device 1 transmits the script data requested at Step S104 to the user terminal 2.

At Step S106, the arithmetic/logic unit of the user terminal 2 executes the script data.

At Step S107, the communication unit of the user terminal 2 transmits a request for contents of the chatbot and a tenant ID to identify a contractor (tenant) of the chatbot to the server device 1.

The tenant ID is information stored on the user terminal 2 in advance. Note that a browser used for the chatbot may hold the tenant ID, or an application that implements the chat functions may hold the tenant ID.

At Step S108, the arithmetic/logic unit of the server device 1 obtains information on the contract corresponding to the tenant ID from the contract information DB. Then, the arithmetic/logic unit of the server device 1 determines the contract state and the like based on the tenant ID. In the following, an example will be described in the case where a contract has been determined to be in a state in which the chatbot service is available.

At Step S109, the server device 1 obtains an access target and changes the display, for example, as follows.

Figure 12:
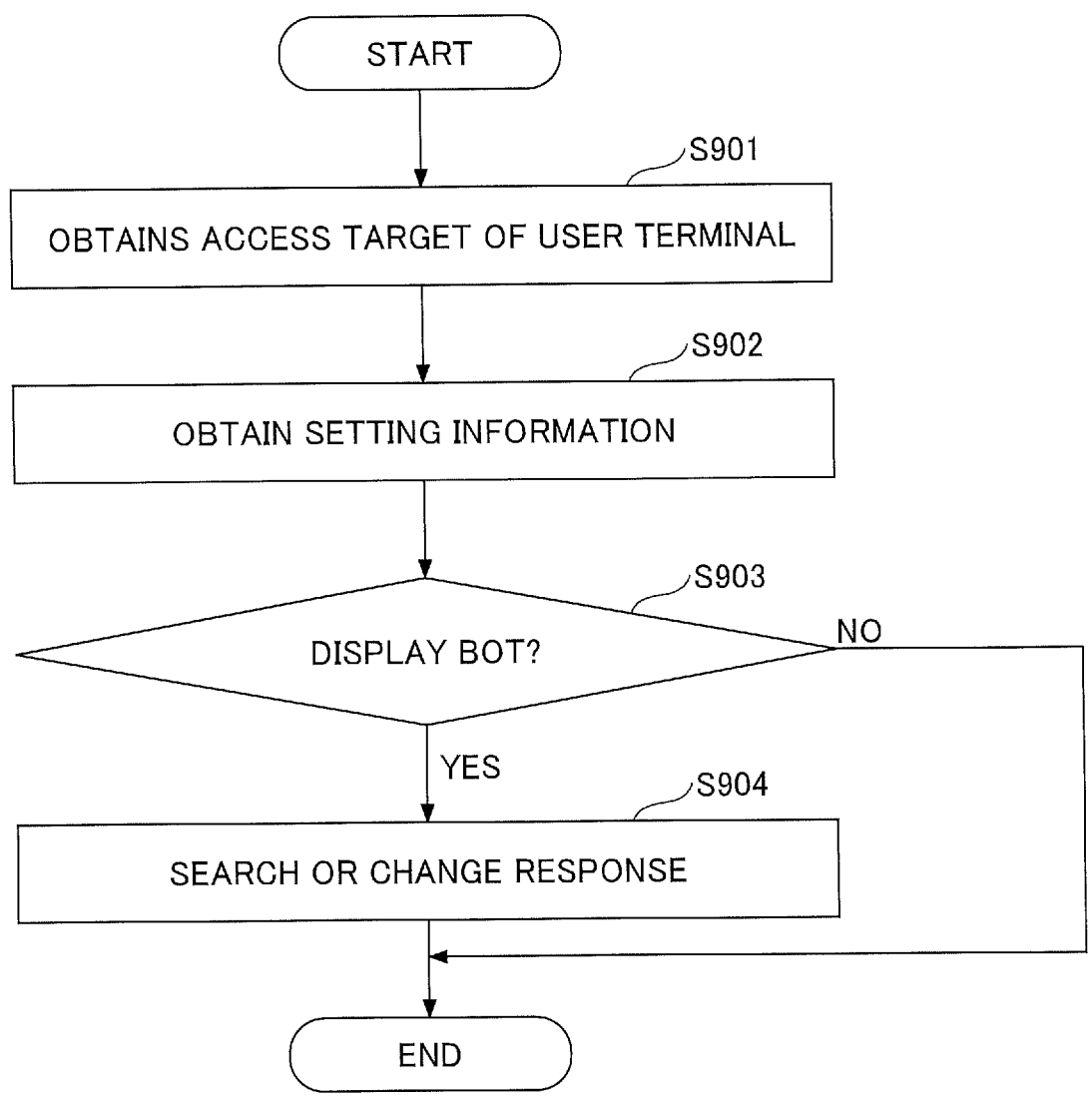
FIG. 12 is a diagram illustrating an example of processing such as obtaining and changing an access target according to the first embodiment.

FIG. 12 is a diagram illustrating an example of processing such as obtaining and changing an access target according to the first embodiment. Note that the processing as illustrated in the figure may be executed at a timing other than at Step S109. For example, the processing as illustrated in the figure may be executed every time the page accessed from the user terminal 2 changes or every time a request for the bot is received.

At Step S901, the access target information obtaining unit 1004 obtains an access target of the user terminal.

<Example of Obtaining Access Target>

The access target is information that indicates, for example, the file name of a page on which the bot was installed; the URL of the page (Uniform Resource Locator); information on contents displayed as text or images on the page; the title of the page; part of these; or a combination of these. In other words, the access target corresponds to a page on which the bot was called.

Specifically, the access target is information in a format of "saiyo.html" or the like. In this example, the access target is determined as a page that presents contents related to a Japanese word "saiyo", which means "hiring" in English.

Note that based on the obtained information on the access target, in order to determine what kind of contents the page presents, information on the composition of the page, or on association between the obtained information on the access target and the contents is input into the server device 1 in advance. Therefore, once having obtained the information on the access target, the access target information obtaining unit 1004 can recognize which page among multiple pages having the bot installed the user terminal is accessing.

For example, the access target may be the title or the like of the page.

It is often the case that the title of a page is written in a form of "<title> . . . </title>" in the source of the page (i.e., the source file for displaying the page, which also includes information to be set in the header, footer, or the like) written in the HTML (Hyper Text Markup Language) format. Therefore, in the example described above, the title represented as a text set with the tag "<title>" (text set in the part " . . . " in the example described above) may be analyzed to obtain the access target. It is often the case that the title of a page is written in words that represent the contents of the page to inform the user of the contents of the page. Therefore, once having identified the title of the page, it is possible to precisely identify what contents the page accessed by the user terminal 2 has.

Similar to the title of a page, it is often the case that the file name, URL, or the like is written in words that represent the contents of the page. Therefore, by identifying the file name or URL of the page, it is possible to precisely identify what contents the page accessed by the user terminal 2 has.

As illustrated in the example described above, the access target simply needs to be information with which the contents of a page accessed by the user terminal 2 can be identified. Therefore, the access target may be obtained as a result of analyzing elements in the page or the source file to estimate the contents presented in the page.

Specifically, in order to obtain the access target, first, analysis may be executed based on information on the contents displayed as text or images on the page. For example, similar to the title described above, the text or images displayed on the page may be analyzed to estimate the word or content that appears most frequently as the contents presented on the page.

For example, on home pages of manufacturers that introduce products, it is often the case that "item", "product", or words similar to these are displayed in text or images. Therefore, words representing the contents of the page may be identified by analyzing the text, images, or the like displayed on the page. In this way, by analyzing information on the contents, it is possible to precisely identify what contents the page accessed by the user terminal 2 has.

<Example of Extracting Keywords or Synonyms>

The extraction unit 1006 may extract keywords.

A keyword is a word that represents the contents displayed on a page accessed by the user terminal 2. For example, keywords are extracted by analyzing content information such as text or images displayed on a page. Note that data and settings used for character recognition or object recognition are input in advance.

Note that a keyword may be a synonym (may also referred to as an "analog", "equivalent", or the like). Specifically, first, a database for identifying synonyms (a so-called synonym dictionary or the like) is built in the server device 1 in advance. By doing so, for example, "hiring", "recruiting", "personnel recruitment", and the like are recognized as words referring to a similar content.

As described above, once having obtained the access target, the server device 1 can recognize what contents the page accessed by the user terminal 2 has. Therefore, in the subsequent processing of a search, a response, and the like, the server device 1 can execute the processing by narrowing down the contents to those similar to the access target. Specifically, in the case where a user is browsing a page that introduces "products", it is often the case that he/she enters a question to the bot based on an assumption that this is a page of contents related to "products". Thereupon, in the case where the user enters a question of "how to request materials", it is often the case that the "materials" is assumed to refer to the materials for the products.

Alternatively, for example, in the case of asking a question on time such as "from when", it is often the case that a user who uses the user terminal 2 accessing a page of "product introduction" and the like is asking the question meaning "when to start product sales". On the other hand, in the case of asking the same question on time such as "from when" by a user who uses the user terminal 2 accessing a page of information on hiring and the like, it is often the case that the question is asking "when to start the hiring test". In this way, it is often the case that the same input has different assumptions depending on the access target. Therefore, it is desirable that the server device 1 is capable of narrowing down contents based on the access target with such an assumption.

Note that multiple elements may be used in combination to obtain the access target. For example, the URL, keywords, and content information may be analyzed separately, to determine the access target by a majority of the analysis results or the like.

Also, part of these items of information may be used for obtaining the access target. For example, in the case where there are multiple images presented on a page, the information to be used may be limited such that only an image having the largest image size is to be processed.

At Step S902, the change unit 1005 obtains the setting information.

The setting information is, for example, information representing what range is to be set for a search or what response is to be made in a change to be executed at a later stage. For example, the setting information is set in advance by the administrator or the like.

Specifically, the setting information represents whether to display or hide a bot. For example, depending on the page, the administrator may want to set the bot to be hidden (not to be displayed). Therefore, the setting information is information or the like in which a page is associated with whether to display or hide the bot on the page, so as to specify on what types of pages, the bot is displayed. By providing such setting information, the change unit 1005 can change the bot on each page to be displayed or to be hidden.

Also, the setting information is information for narrowing down or switching the range to be searched or the contents of a response. Then, based on the setting information, the change unit 1005 narrows down or switches the DBs used for the search as an example of the range to be searched.

For example, in the case where the access target is "hiring", the setting information is information on a setting to switch the DB to be searched in, to a DB including contents related to personnel matters. Also, the setting information is information or the like for setting categories and the like so that contents extracted from the DBs in a search are narrowed down to contents related to personnel matters.

By providing such setting information, based on the information on the access target, it is possible to limit the contents to be responded, to change the scenario, to switch the FAQ, to change the search conditions (or settings of filters etc.), or the like. Then, when the target to be searched is changed based on the setting information and the like, the contents to be displayed and responded are narrowed down to the contents of the access target, and output.

Specifically, in the case where a question such as "how to request materials" is input on the user terminal 2 that is accessing a page such as "product introduction", the change unit 1005 searches only for catalogs and the like of "products", so as to exclude search results of materials used for the other categories such as "hiring"; not to extract such materials in the search; or not to use such search results in subsequent responses or displays.

At Step S903, the change unit 1005 refers to the value of the item of "display or hide" corresponding to the setting information obtained at Step S902; and then, if the value of the item is "display", determines that the bot is to be displayed (YES at Step S903), and proceeds to Step S904. On the other hand, if the value is "hide", the change unit 1005 determines that the bot is not to be displayed (NO at Step S903), and ends the process without executing Step S904.

At Step S904, the change unit 1005 changes the search or response. Specifically, the DBs and the like are changed based on the setting information and the like. Thereafter, the processing of a search, response, or the like is executed based on the settings changed at Step S904. For example, the change unit 1005 executes a change as follows.

Figure 13:
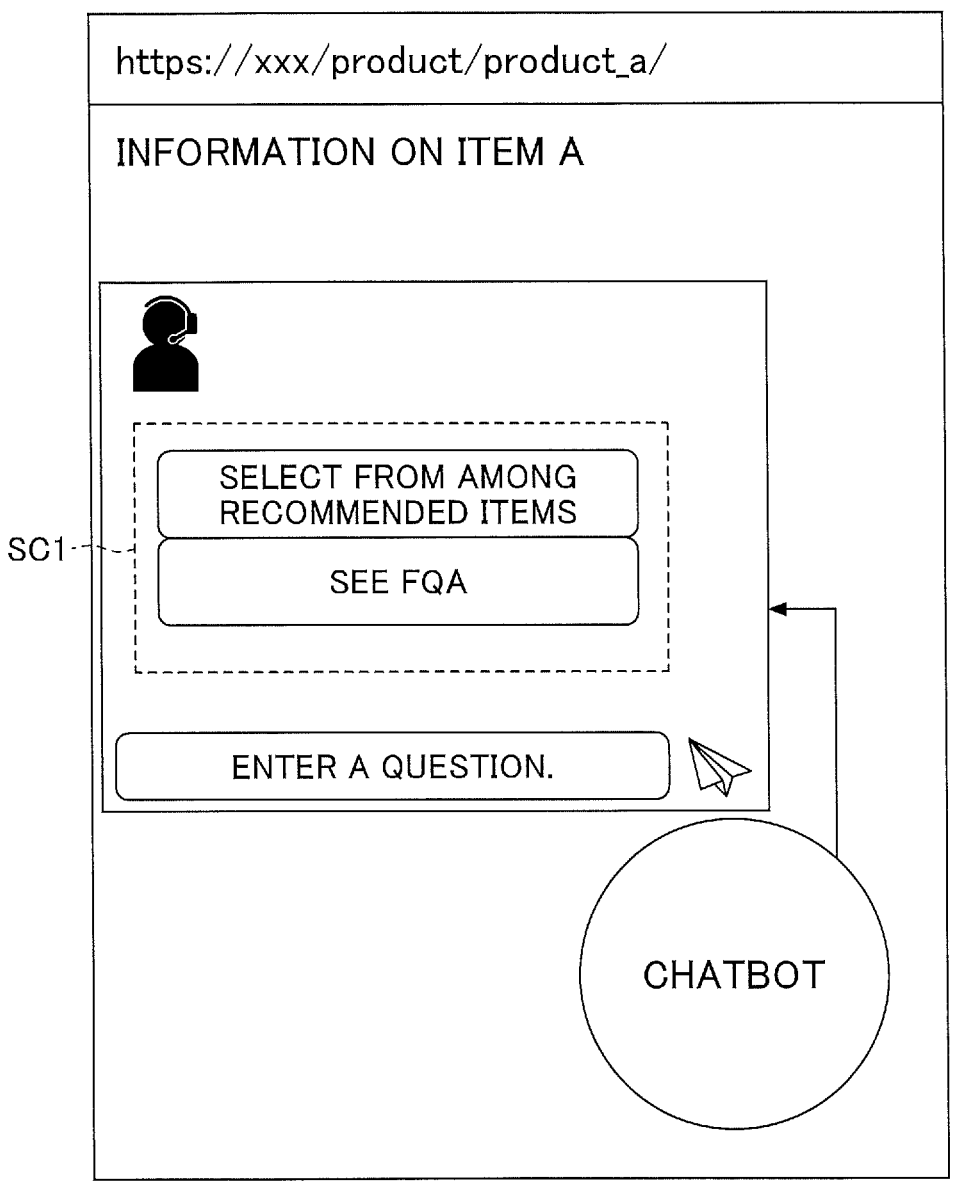
FIG. 13 is a diagram illustrating an example in the case of an access target being a page of "product introduction" according to the first embodiment.

FIG. 13 is a diagram illustrating an example in the case of the access target being a page of "product introduction" according to the first embodiment.

Figure 14:
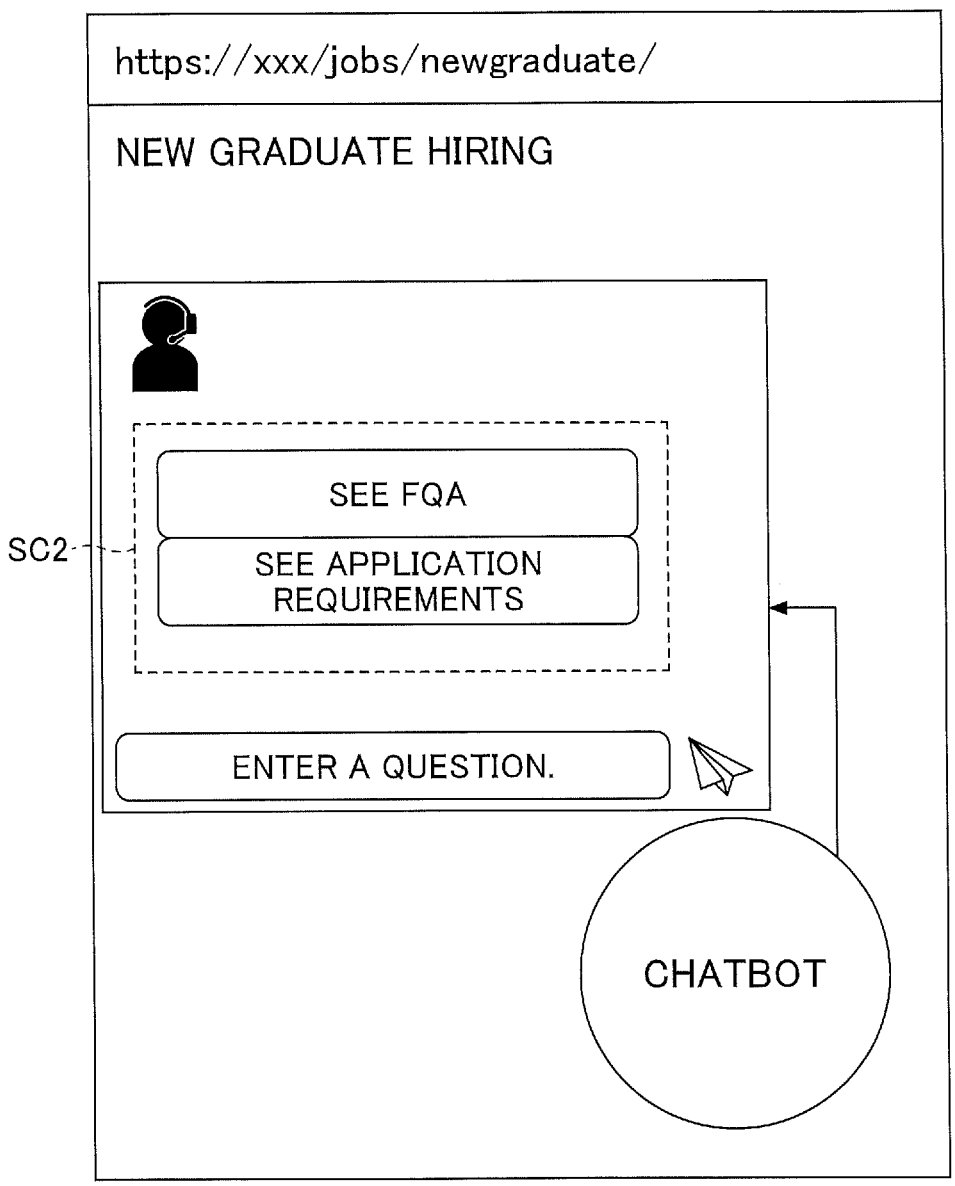
FIG. 14 is a diagram illustrating an example in the case of the access target being a page of "new graduate recruiting" according to the first embodiment.

FIG. 14 is a diagram illustrating an example in the case of the access target being a page of "new graduate recruiting" according to the first embodiment.

Figure 15:
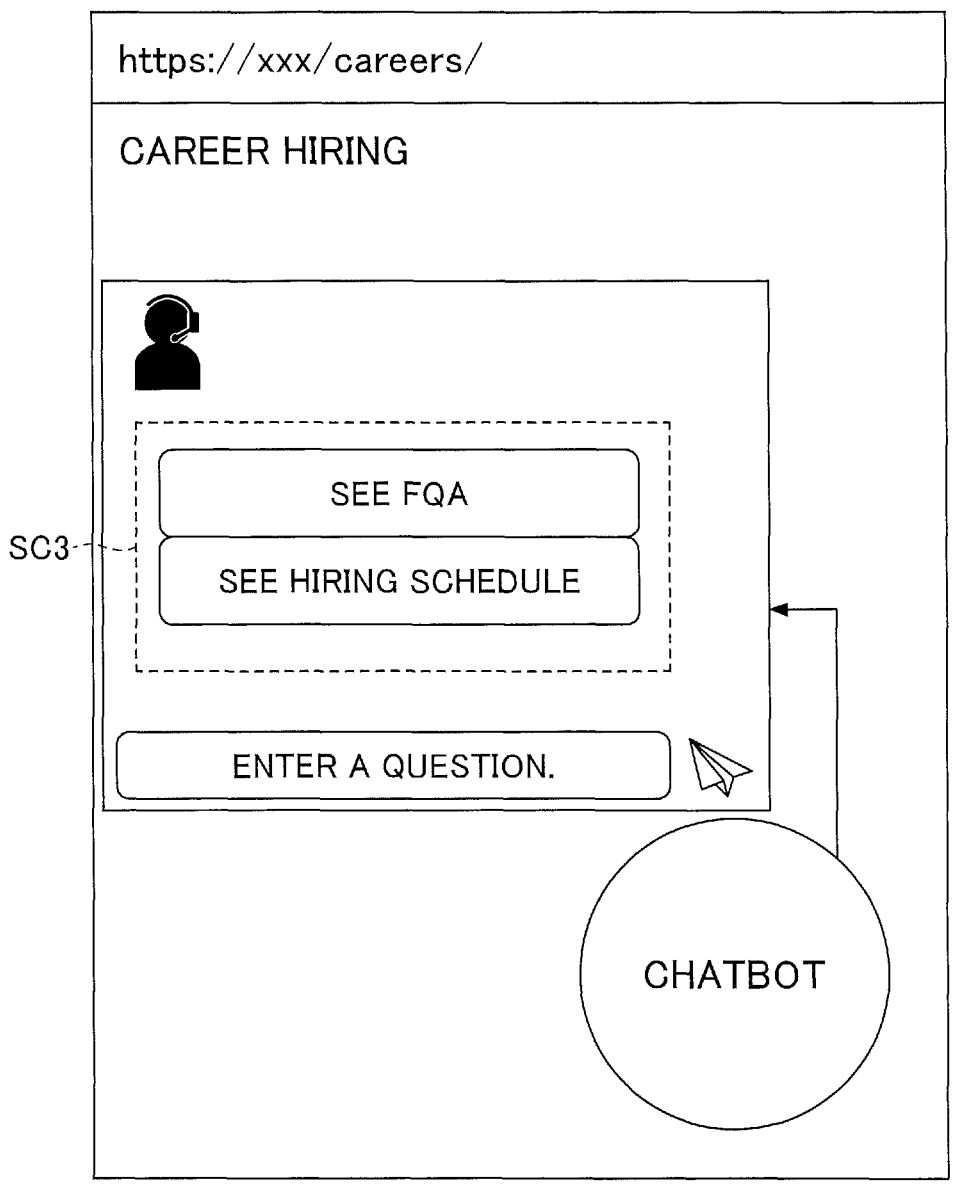
FIG. 15 is a diagram illustrating an example in the case of the access target being a page of "career recruiting" according to the first embodiment.

FIG. 15 is a diagram illustrating an example in the case of the access target being a page of "career recruiting" according to the first embodiment.

Figure 16:
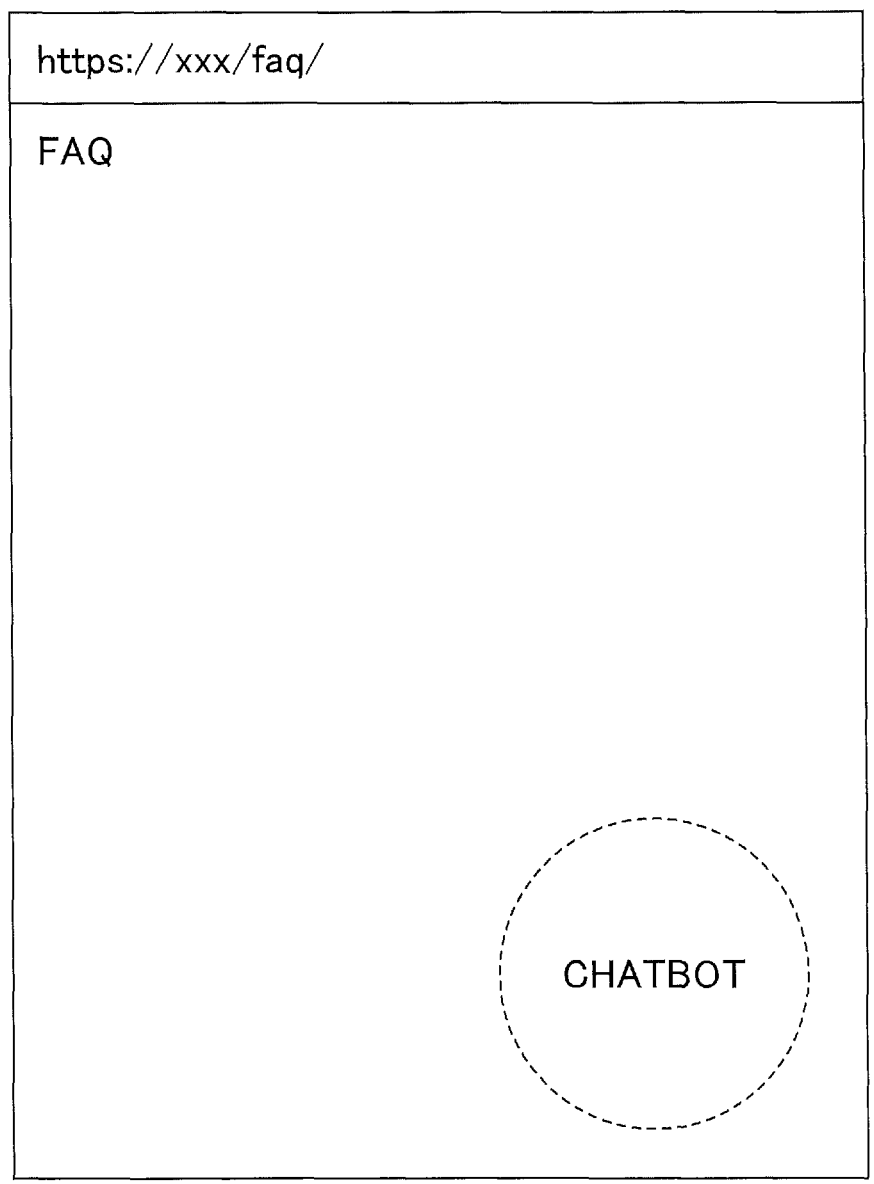
FIG. 16 is a diagram illustrating an example in the case of the access target being a page of FAQ according to the first embodiment.

FIG. 16 is a diagram illustrating an example in the case of the access target being a page of FAQ according to the first embodiment.

In the following, as illustrated in the figures, examples will be described in the case where the chatbot is installed for four pages of "product introduction", "new graduate recruiting", "career recruiting", and "FAQ".

When the user clicks a chatbot icon displayed on the pages, a chatbot screen is displayed based on the information registered in an setting information table as illustrated in Table 1 below.

TABLE 1

TENANT ID = 001
HOME PAGE URL: https://xxx/

| APPLICATION RANGE | URL | DISPLAY OR HIDE | SCENARIO ID | CATEGORY ID | FAQ MASTER ID | SYNONYM DICTIONARY ID |
|---|---|---|---|---|---|---|
| INCLUDE SUBLAYERS | /product/ | DISPLAY | 01 SELECT FROM AMONG RECOMMENDED ITEMS 02 SELECT FROM AMONG FAQ | 01 ITEM | 01 ITEM | 01 ITEM |
| NOT INCLUDE SUBLAYERS | /jobs/ newgraduate/ | DISPLAY | 02 SELECT FROM AMONG FAQ | 01 ITEM | 01 ITEM | 01 ITEM |
|  |  |  | 03 SEE APPLICATION REQUIREMENTS | 02 HIRING | 02 HIRING | 02 HIRING |
| NOT INCLUDE SUBLAYERS | /jobs/ careers/ | DISPLAY | 02 SELECT FROM AMONG FAQ | 01 ITEM | 01 ITEM | 01 ITEM |
|  |  |  | 04 SEE HIRING SCHEDULE | 02 HIRING | 02 HIRING | 02 HIRING |
| INCLUDE SUBLAYERS | /faq/ | HIDE | — | — | — | — |

In Table 1 above, the field of "application range" represents an item indicating to which range of URLs the setting information is applied based on a set URL as reference. For example, as in the first record, if "include sublayers" is set and "URL" is set to "/product/", in the case where the access target is "/product/product_a/", "/product/product_b/", or the like, as it is a sublayer of "/product/", it is determined to apply the setting information of the first record.

On the other hand, in Table 1 above, for example, as in the third record, if "application range" is set to "not include sublayers" and "URL" is set to "/jobs/careers/", the setting information in the third record is applied only in the case of the access target being "/jobs/careers/", and not applied to sublayers. Alternatively, a special keyword may be set to "URL", to apply the setting information to an access target that includes the keyword set to "URL". Also, in the example described above, although the URL is presented in a relative path, it may be set in an absolute path (e.g., "http://xxx/faq/", etc.).

For example, in the case where the user clicks the chatbot icon installed on the page of information on item A illustrated in FIG. 13, it is determined to which record of the setting information the URL of this page corresponds. In this example, "https://xxx/product/product_a/" corresponds to a sublayer of "/product/" in the first record of the setting information. Thereupon, the setting information of the first record is applied to this example. Then, an item scenario SC1 is displayed. Then, the category of "item", the FAQ master of "item", and the synonym dictionary of "item" are applied to a search for response information corresponding to the question input by the user.

In the case where the user clicks the chatbot icon installed on the page of "new graduate recruiting" illustrated in FIG. 14, it is determined to which record of the setting information the URL of this page corresponds. In this example, "https://xxx/jobs/newgraduate/" matches the URL "/jobs/newgraduate/" in the second record of the setting information. Therefore, the setting information of the second record is applied to this example. Then, a new graduate hiring scenario SC2 is displayed. Then, the category of "hiring", the FAQ master of "hiring", the synonym dictionary of "hiring", the category of "item", the FAQ master of "item", and the synonym dictionary of "item" are applied to a search for response information corresponding to the question input by the user.

In the case where the user clicks the chatbot icon installed on the page of "career recruiting" illustrated in FIG. 15, it is determined to which record of the setting information the URL of this page corresponds. In this example, "https://xxx/jobs/careers/" matches the URL "/jobs/new careers/" in the third record of the setting information. Therefore, the setting information of the third record is applied to this example. Then, a career hiring scenario SC3 is displayed. Then, the category of "hiring", the FAQ master of "hiring", the synonym dictionary of "hiring", the category of "item", the FAQ master of "item", and a synonym dictionary of "item" are applied to a search for response information corresponding to the question input by the user.

In the case where the user clicks the chatbot icon installed on the page of FAQ illustrated in FIG. 16, it is determined to which record of the setting information the URL of this page corresponds. In this example, "https://xxx/faq/" matches the URL "/faq/" in the fourth record of the setting information. Thereupon, the setting information of the fourth record is applied to this example. Therefore, the chatbot icon is not displayed on the FAQ page because the "display or hide" item is set to "hide" in the setting information.

Figure 17:
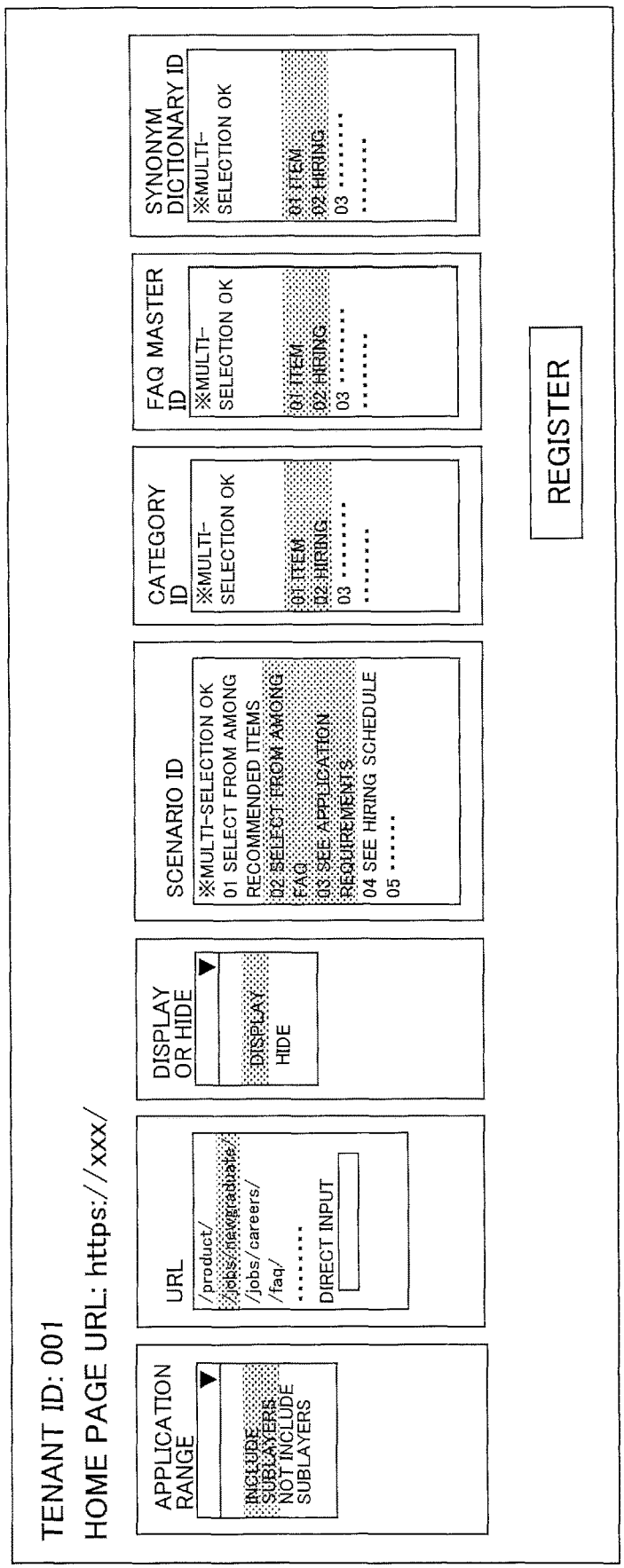
FIG. 17 is a diagram illustrating an example of a registration screen for setting information according to the first embodiment.

FIG. 17 is a diagram illustrating an example of a registration screen for setting information according to the first embodiment. When a registration operation is executed on the screen as illustrated in the figure, for example, a setting information table as illustrated in Table 1 above is registered. Note that shaded items in the figure indicate items that are currently selected.

For example, by selecting the items one by one as illustrated in the figure, and then, pressing the "register" button, one record of the setting information is set as illustrated in Table 1 above.

In response to the operations as illustrated in the figure, the second record of the setting information in Table 1 above is generated.

For example, as described above, Step S109 is executed.

At Step S110, the communication unit of the server device 1 transmits information on contents and the like to the user terminal 2 for executing a dialog with the bot.

At Step S111, the output unit 2002 of the user terminal 2 displays the contents and the like for executing the dialog with the bot.

Then, in some cases, the administrator may set an icon for an operation to start the chatbot service to be displayed. In such a case (corresponding to "in case of displaying icons" in the figure), the chatbot system 100 proceeds to Step S112. On the other hand, in the case of setting the icon not to be displayed, the chatbot system 100 proceeds to Step S114.

At Step S112, the user executes an operation, for example, of pressing the icon to start the chatbot service. Therefore, the input unit 2001 of the user terminal 2 receives the operation of pressing the icon.

At Step S113, the output unit 2002 of the user terminal 2 starts a dialog with the chatbot based on a scenario or the like. In the following, an example will be described in the case where a scenario is selected by the user to start a dialog. For example, one of the screens illustrated in FIGS. 13 to 16 is displayed on the user terminal 2 and the dialog starts.

At Step S114, the user executes an operation to select a scenario. Specifically, as illustrated in Table 1 above, multiple "scenario ID" may be set. In such a case, the output unit 2002 of the user terminal 2 displays a GUI that causes the user to select one of the multiple scenarios.

At Step S115, the input unit 2001 of the server device 1 receives an operation to select a scenario that has been executed at Step S114. Then, the communication unit of the server device 1 transmits a notice indicating the selected scenario to the server device 1.

At Step S116, the control unit of the server device 1 identifies the contents to be displayed in the dialog in the scenario identified by the setting information.

For example, if an option of "select in all categories" is selected at Step S31, the contents are identified to respond with the "category name" or the like of a category set in the "category ID" or the like in the setting information switched at Step S109.

Also, if an option of "select from among FAQ" is selected at Step S31, first, for example, the top five or so questions are extracted based on query history information that has been generated during a predetermined period of time.

Alternatively, for example, suppose that a scenario of "searching for an extension telephone number" or the like is selected at Step S114. In such a case, for example, the contents are identified so as to respond with a predetermined message such as "Please enter a name".

At Step S117, the communication unit of the server device 1 transmits the contents to be displayed.

At Step S118, the output unit 2002 of the user terminal 2 displays the contents transmitted at Step S117. In the following, suppose that questions, searches, and responses are made, for example, as illustrated in FIG. 5, according to a scenario determined at Step S109 and the like.

At Step S119, the user enters a question. Therefore, at Step S119, the input unit 2001 of the user terminal 2 receives the input. Then, input information representing the received question is generated.

At Step S120, the input information obtaining unit 1001 obtains the input information from the user terminal 2.

At Step S121, the search unit 1002 searches for response information corresponding to the input information.

At Step S122, the response unit 1003 responds with the response information. Here, the response unit 1003 may respond with a response message obtained by applying predetermined processing to the response information, namely, may respond with a response message based on the response information.

At Step S123, the output unit 2002 of the user terminal 2 displays an answer to the question and the like based on the response information.

Processing at Steps S119 through S123 may be executed repeatedly. Note that processing at Steps S124 through S128 may be executed after a response has been made with an answer, namely, after Step S123 has been executed.

At Step S124, the output unit 2002 of the user terminal 2 displays input items for examining the degree of satisfaction. In other words, the output unit 2002 of the user terminal 2 displays a questionnaire or the like for examining the degree of satisfaction of the user with respect to the answer obtained at Step S123 and the like, and displays a GUI for the user to enter the degree of satisfaction.

At Step S125, the user enters the degree of satisfaction.

At Step S126, the communication unit of the user terminal 2 transmits the contents entered at Step S125, namely, a notice of a result of the questionnaire or the like, to the server device 1.

At Step S127, the storage unit of the server device 1 stores a history of contents, contents of the dialog, or the like transmitted at Step S126.

Note that the server device 1 may perform statistical processing of the degree of satisfaction based on the contents of the degree of satisfaction. Specifically, the server device 1 displays the degree of satisfaction of dialogs with the chatbot (degree of satisfaction entered by the user as, for example, "satisfied", "dissatisfied", "not applicable", "unknown", or the like at Step S125) for a predetermined period of time by means of a graph or the like for the administrator. With such feedback of a result of the statistical processing of such degrees of satisfaction, the administrator can objectively know the degree of satisfaction.

At Step S128, the control unit of the user terminal 2 returns to, for example, Step S112 or Step S114. In other words, the control unit of the user terminal 2 returns to a so-called initial screen of the chatbot. Note that at Step S128, the chatbot system may end the chatbot.

As described above, if processing of a search and a response executed at a later stage is changed based on the access target of the user terminal 2, the response can be made according to the contents and the like assumed by the user.

On the contrary, if the bot is used in the same way on multiple pages, a search or response is executed in a state of lacking the assumption defined based on the access target; therefore, a response missing the point of a question of the user may be made, which may result in low convenience for the user.

In order to respond precisely to a question of the user, if a bot is installed and configured separately on each page, the bots need to be managed separately, and thereby, the management load is increased and the convenience of using the bots is reduced.

Compared to these examples as described above, if a configuration is adopted in which a change is made based on the access target, it is possible to manage the bot more easily, and to respond to the user more appropriately.

Also, bots are not installed on the respective pages; therefore, the time and effort of management and the like can be reduced. Also, the user can reduce the time and effort required for reaching a desired answer.

In this way, the use of bots can be improved.

Second Embodiment

In the chatbot system 100 according to the first embodiment, the administrator (or the user) or the like uses a registration screen, for example, as illustrated in FIG. 17, to set the setting information on each page, and hence, needs to spend the time and effort for setting the setting information.

Thereupon, in a second embodiment, a method will be described that makes the setting of the setting information easier in a chatbot system (information processing system) 100 that uses the same chatbot on multiple pages and changes the setting information depending on the access target of the user terminal 2.

<Functional Configuration>

Figure 18:
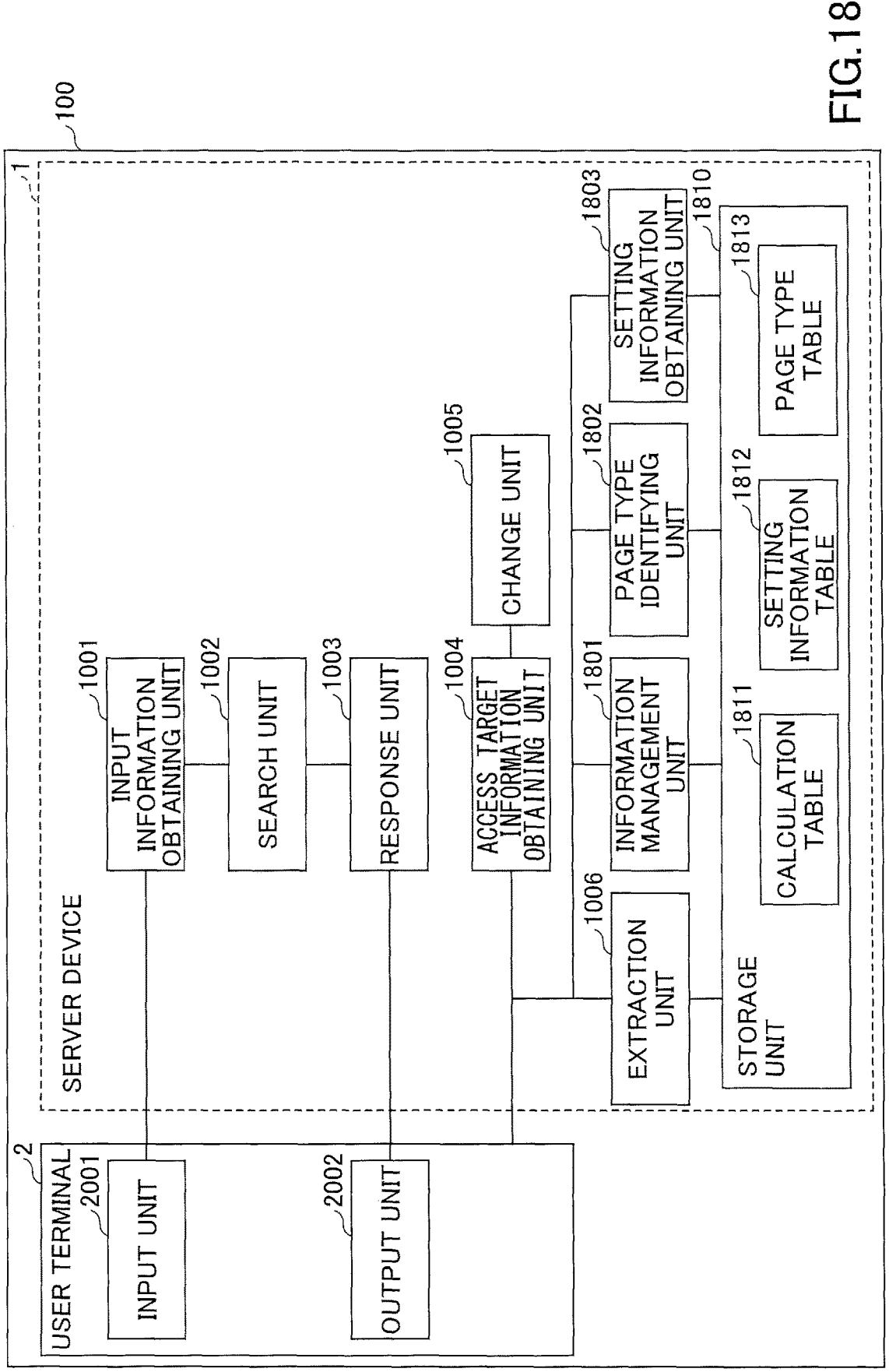
FIG. 18 is a diagram illustrating an example of a functional configuration of a chatbot system according to a second embodiment.

FIG. 18 is a diagram illustrating an example of a functional configuration of a chatbot system according to the second embodiment. As illustrated in FIG. 18, the chatbot system 100 according to the second embodiment includes an information management unit 1801, a page type identifying unit 1802, a setting information obtaining unit 1803, and a storage unit 1810, in addition to the functional elements of the chatbot system 100 according to the first embodiment described in FIG. 10.

The information management unit 1801 is implemented by, for example, a program executed by the CPU 101 provided on the server device 1, to store and manage information of a calculation table 1811, a setting information table 1812, and the like in the storage unit 1810.

FIG. 19 is a diagram illustrating an example of a calculation table according to the second embodiment. The information management unit 1801 stores and manages the calculation table 1811, for example, as illustrated in FIG. 19, for each tenant (contractor or the like of the chatbot) in the storage unit 1810 or the like. Note that the calculation table 1811 may be shared by multiple tenants as the single calculation table 1811. In the example in FIG. 19, the calculation table 1811 includes, as items of information, "keyword", "tag type", "page type", "score", and the like.

The "keyword" is a predetermined keyword extracted from the code (source code, HTML source, or the like) of a page (web page). The "tag type" is information representing the type of tag with which the extracted keyword is described. Note that in the example in FIG. 19, although examples of tag types of a page written in HTML are illustrated, in the case of using a language other than HTML, the tag types corresponding to the language can be registered. The "page type" is information representing a page type representing the contents presented on the page, and corresponds to the "page type" of the setting information table 1812, which will be described later. The "score" is information representing a score used for identifying the page type when executing a process of identifying the page type as will be described later.

Note that the same keyword "solution" may appear on an item page (page type of "item"), and may appear a FAQ page (page type of "FAQ"). In the example in FIG. 19, the keyword "solution" is more likely to appear on item pages, the score of the page type of "item" is set higher than the score of the page type of "FAQ".

As an example, the information management unit 1801 functions as a web server to provide a web page for setting the calculation table 1811 as illustrated in FIG. 19 for the manager terminal 3 or the like, and stores the calculation table 1811 set by the administrator in the storage unit 1810 or the like.

As another example, the information management unit 1801 may generate the calculation table 1811 as illustrated in FIG. 19 as a learning effect of machine learning. Here, machine learning is a technology that causes a computer to obtain the ability to learn like people, which refers to a technology in which a computer autonomously generates an algorithm necessary for determination such as data identification from training data incorporated in advance, and applies the algorithm to new data to make predictions. The learning method for machine learning may be any one among supervised learning, unsupervised learning, semi-supervised learning, reinforcement learning, deep learning, and further, may be a learning method combining these learning methods; namely, any learning method can be used for machine learning.

FIG. 20 is a diagram illustrating an example of a setting information table according to the second embodiment. The information management unit 1801 stores and manages the setting information table 1812, for example, as illustrated in FIG. 20, for each tenant in the storage unit 1810 or the like. Note that the setting information table 1812 may be shared by multiple tenants as the single setting information table 1812. In the example in FIG. 20, the setting information table 1812 stores setting information 2012 for each page type 2011, which includes field of "display or hide", "scenario ID", "category ID", "FAQ master ID", and "synonym ID". Note that each field of information included in the setting information 2012 may be the same as the corresponding field of information included in Table 1.

As an example, the information management unit 1801 functions as a web server to provide a web page for setting the setting information table 1812 as illustrated in FIG. 20 for the manager terminal 3 or the like, and stores the setting information table 1812 set by the administrator in the storage unit 1810 or the like.

Here, referring to FIG. 18 again, the description of the functional elements of the chatbot system 100 will continue.

The page type identifying unit 1802 is implemented by, for example, a program executed by the CPU 101 provided on the server device 1, and the extraction unit 1006 uses keywords extracted from the page and the calculation table 1811 as illustrated in FIG. 19, to execute a process of identifying the page type. Note that process of identifying the page type executed by the page type identifying unit 1802 will be described later using a flow chart.

The setting information obtaining unit 1803 is implemented by, for example, a program executed by the CPU 101 provided on the server device 1, which uses the page type of the access target and the setting information table 1812 as illustrated in FIG. 20, to obtain setting information of the page of the access target. For example, at Step S902 in FIG. 12, in the case where the page type of the page of the access target is "item", the setting information obtaining unit 1803 obtains the setting information 2012 corresponding to the page type "item" from the setting information table 1812 as illustrated in FIG. 20.

Note that at Step S902 in FIG. 12, the setting information obtaining unit 1803 may use a page type table 1813 generated in advance by the page type identifying unit 1802, to obtain the page type of the page of the access target. Also, as another example, at Step S902 in FIG. 12, the setting information obtaining unit 1803 may use the page type identifying unit 1802 to identify the page type of the page of the access target. The storage unit 1810 may be implemented by, for example, the RAM 203, the memory 204, an auxiliary storage device (i.e., storage devices) provided on the server device 1, and a program executed by the CPU 101.

The storage unit 1810 stores, for example, the calculation table 1811, the setting information table 1812, and the page type table 1813 which will be described later.

Note that the functional configuration of the chatbot system 100 illustrated in FIG. 18 is merely an example. For example, the functional elements included in the server device 1 in FIG. 18 may be provided to be distributed on multiple information processing apparatuses. For example, the storage unit 1810 may be implemented as a storage server, a cloud service, or the like external to the server device 1.

\<Processing Flow\>

(Process of Identifying Page Type)

Figure 21:
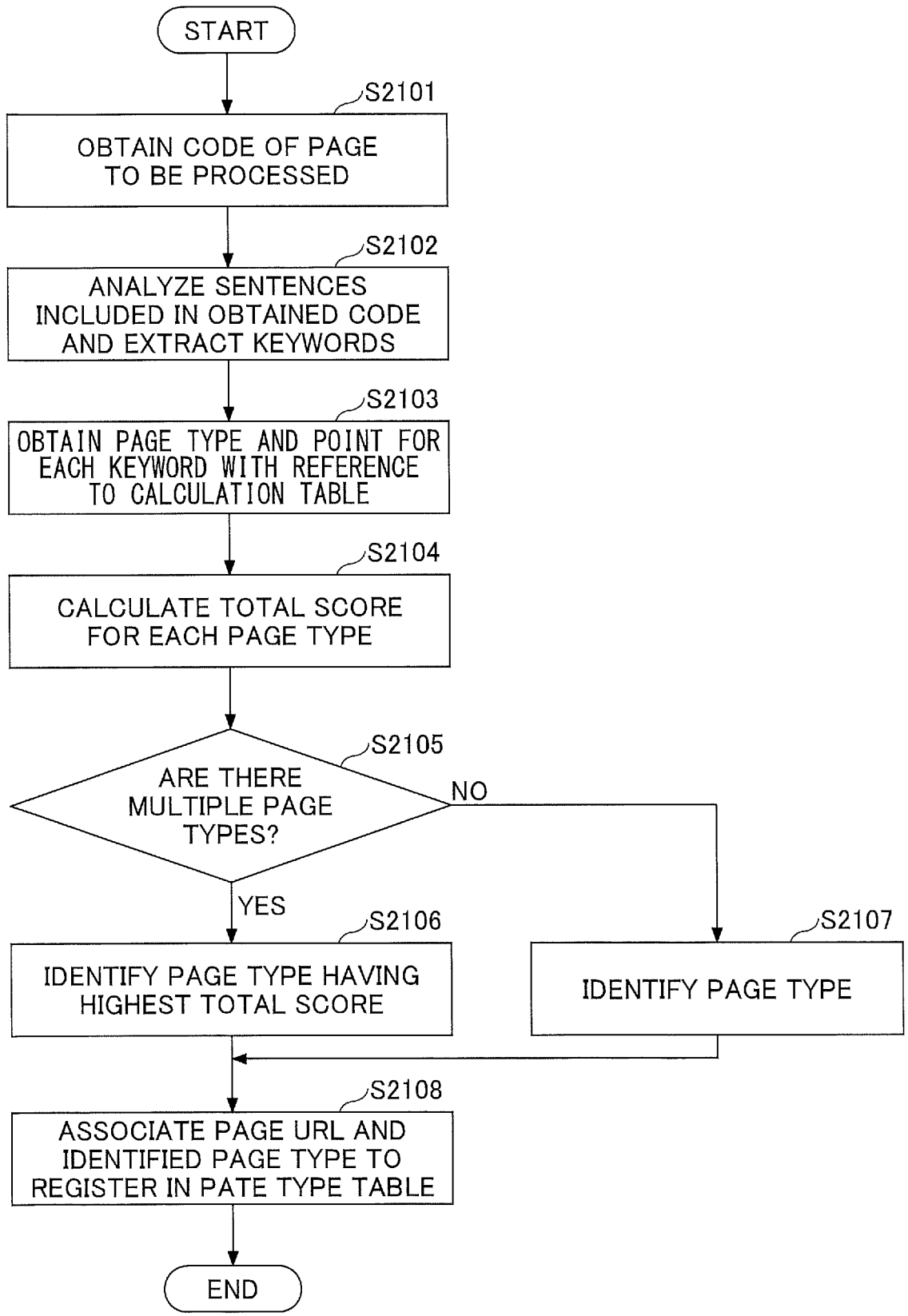
FIG. 21 is a flow chart illustrating an example of a process of identifying a page type according to the second embodiment.

FIG. 21 is a flow chart illustrating an example of process of identifying a page type according to the second embodiment. This process shows an example of process of identifying the page type executed by the page type identifying unit 1802 in response to a command issued by the administrator (or the user), for example, before making a web page (page) public. Note that this process may be executed by the page type identifying unit 1802 in response to a request from the setting information obtaining unit 1803, for example, at Step S902 in FIG. 12.

At Step S2101, the extraction unit 1006 obtains the code (source code, HTML source, etc.) of the page to be processed.

At Step S2102, the extraction unit 1006 analyzes statements included in the obtained code to extract keywords. For example, the extraction unit 1006 decomposes the obtained code into multiple words by using a well-known method of analyzing natural language such as morphological analysis, to extract keywords set in advance as the "keyword" in the calculation table 1811 as illustrated in FIG. 19.

FIG. 22 is a diagram illustrating an example of a code of a page according to the second embodiment. For example, the extraction unit 1006 extracts keywords "solution" and "is it" stored in the calculation table 1811 illustrated in FIG. 19 from the code 2201 illustrated in FIG. 22.

At Step S2103, the page type identifying unit 1802 obtains the "page type" and the "score" for each keyword extracted by the extraction unit 1006 with reference to the calculation table 1811.

For example, regarding the keyword "solution" included in the code 2201 illustrated in FIG. 22, the page type identifying unit 1802 obtains the following information with reference to the calculation table 1811:

Tag type \<title\>: a score of 10 for page type "item";

Tag type \<h1\>: a score of 8 for "item" and a score of 5 for "FAQ";

Tag type \<h1\>\<p\>: a score of 4 for "item" and a score of 2 for "FAQ"; and

Tag type \<h2\>: a score of 6×2 for "item" and a score of 3×2 for "FAQ".

Similarly, the page type identifying unit 1802 obtains the following information on the keyword "is it":

Tag type \<h2\>\<p\>: a score of 1 for page type "FAQ".

At Step S2104, the page type identifying unit 1802 calculates the total score for each page type from the information obtained at Step S2103. In this way, in the example described above, the total scores are calculated as in a table of total scores 2202 illustrated in FIG. 22. In the example in FIG. 22, the total score for the page type "item" is 34, and the total score for the page type "FAQ" is 14.

At Step S2105, the page type identifying unit 1802 determines whether multiple page types are obtained at Step S2103. In the case where multiple page types are obtained, the page type identifying unit 1802 causes the processing to transition to Step S2106. On the other hand, in the case where multiple page types are not obtained, the page type identifying unit 1802 causes the processing to transition to Step S2106.

Upon transitioning to Step S2106, the page type identifying unit 1802 identifies a page type having the highest total score among the multiple page types. For example, in the example of the table of total scores 2202 illustrated in FIG. 22, the page type identifying unit 1802 identifies the page type "item" as the page type having the highest total score.

On the other hand, upon transitioning to Step S2107, the page type identifying unit 1802 identifies the page type obtained at Step S2103.

At Step S2108, the page type identifying unit 1802 associates the URL of the page to be processed with the identified page type, and registers the associated data, for example, in the page type table 1813 as illustrated in FIG. 23.

FIG. 23 is a diagram illustrating an example of the page type table 1813 according to the second embodiment. For example, as illustrated in FIG. 23, in the page type table 1813, one or more URLs of pages (home pages) are stored in association with the page types corresponding to the respective URLs. For example, in the example in FIG. 23, one of the records shows that upon execution of the process of identifying a page type described in FIG. 21, the page type identifying unit 1802 identifies the page type "item" for the page of URL "https://xxx/product/".

According to the above process, the page type identifying unit 1802 can identify the page type of the page, by using keywords included in the page and the calculation table 1811 as illustrated in FIG. 19.

Also, the setting information obtaining unit 1803 can obtain the setting information 2012 corresponding to the identified page type, for example, from the setting information table 1812 illustrated in FIG. 20.

As described above, according to the second embodiment, it is possible to make the setting of the setting information easier in the chatbot system (information processing system) 100 that uses the same chatbot on multiple pages and changes the setting information depending on the access target of the user terminal 2.

For example, in the chatbot system 100 according to the first embodiment, the administrator (or the user) or the like uses a registration screen, for example, as illustrated in FIG. 17, to set the setting information on each page, and hence, needs to spend the time and effort for setting the setting information.

In contrast, in the chatbot system 100 according to the second embodiment, it becomes possible to easily set the setting information of each page, for example, once having registered or generated the calculation table 1811 as illustrated in FIG. 19 and the setting information table 1812 as illustrated in FIG. 20.

As described above, according to the embodiments in the present disclosure, it is possible improve the convenience when using bots.

Other Embodiments

In an information processing system, the procedures in the information processing method described above may be executed in parallel, in a distributed form, and/or with redundancy on multiple information processing apparatuses and the like. Also, the information processing system may be configured to use so-called cloud computing.

Also, each device does not need to be a single device necessarily. In other words, each device may be a combination of multiple devices. Note that the information processing system may be configured to further include devices other than the devices described above.

Also, the information processing system and the information processing apparatus may use AI (Artificial Intelligence) and the like. For example, the information processing system and the information processing apparatus may be configured to execute machine learning and the like upon input of characters, so as to improve the recognition accuracy.

Note that all or part of processes according to the present disclosure may be described in a computer language and implemented by a program for causing a computer to execute the information processing method. In other words, a program is a computer program for causing a computer such as the information processing apparatus or the information processing system to execute the information processing method.

Therefore, when the information processing method is executed based on the program, an arithmetic/logic device and a control device of the computer execute computing and controlling based on the program to execute each procedure. Also, the storage device of the computer stores data used for the processing, based on the program, to execute each procedure.

Also, the program may be recorded on a computer-readable recording medium to be distributed. Note that the recording medium is a medium such as a magnetic tape, flash memory, optical disk, magneto-optical disk, magnetic disk, or the like. Further, the program may be distributed through an electric telecommunication line.

As above, examples have been described in the embodiments; note that the present disclosure is not limited to the embodiments described above. In other words, various modifications and improvements can be made within the scope according to the present disclosure.

<Supplement>

The functions of the present embodiment described above may be implemented by one or more processing circuits. Here, the "processing circuit" in the present description includes a processor programmed to execute the functions by software, such as a processor implemented by an electronic circuit; an ASIC (Application Specific Integrated Circuit), a DSP (Digital Signal Processor), or an FPGA (field programmable gate array) designed to execute the functions described above; devices such as conventional circuit modules; and the like.

What is claimed is:

1. An information processing apparatus connected to a user terminal that receives input from a user, comprising:
   a memory; and
   a processor configured to execute
   storing, in the information processing apparatus, setting information including, said setting information including procedure information for searching response information corresponding to scenario information that performs a dialog corresponding to input information, and response information corresponding to the scenario information that performs the dialog corresponding to the input information;
   obtaining the input information input into the user terminal;
   searching for the response information corresponding to the input information;
   responding to the user terminal with a response message based on the response information corresponding to the input information;
   obtaining an access target to be accessed by the user terminal in order for the user terminal to receive the input of the input information by the user;
   selecting scenario information from a plurality of pieces of scenario information, and procedure information and response information corresponding to the selected scenario information based on setting information that is associated with the access target;
   changing, based on the selected procedure information and the selected response information, a way to perform the searching or the responding, and
   determining, depending on the setting information that is associated with the access target, whether to display, at the access target, an operation member to activate a chatbot service that is configured to receive the input information corresponding to the access target, thereby controlling to display the operation member at the access target.

2. The information processing apparatus as claimed in claim 1, wherein the access target is information based on a file name of a page accessed by the user terminal, a URL of the page, a title of the page, a text displayed on the page, content information on an image displayed on the page, part of these, or a combination of these.

3. The information processing apparatus as claimed in claim 2, wherein the processor is further configured to execute analyzing the text or the image, to identify contents presented on the page.

4. The information processing apparatus as claimed in claim 1, wherein the processor is further configured to execute extracting a keyword of contents presented on the page accessed by the user terminal, or a synonym of the keyword.

5. The information processing apparatus as claimed in claim 1, wherein the changing switches a bot between a displayed state and a hidden state, or narrows down or switches contents to be searched or responded.

6. The information processing apparatus as claimed in claim 5, wherein the changing narrows down or switches one or more databases to be used by the search unit.

7. The information processing apparatus as claimed in claim 1, wherein the processor is further configured to execute narrowing down or switching a range to be searched by the searching, or contents to be responded by the responding, based on the contents changed by the changing.

8. An information processing system comprising:
   a user terminal configured to receive input from a user; and
   one or more information processing apparatuses connected to the user terminal, the one or more information processing apparatuses including one or more memories, and one or more processor configured to execute
   storing, in the information processing apparatus, setting information including, said setting information including procedure information for searching response information corresponding to scenario information that performs a dialog corresponding to input information, and response information corresponding to the scenario information that performs the dialog corresponding to the input information;
   obtaining input information input into the user terminal,
   searching for response information corresponding to the input information,
   responding to the user terminal with the response information corresponding to the input information,
   obtaining an access target to be accessed by the user terminal in order for the user terminal to receive the input of the input information by the user,
   selecting scenario information from a plurality of pieces of scenario information, and procedure information and response information corresponding to the selected scenario information based on setting information that is associated with the access target;

changing a way to perform the searching or the responding based on the selected procedure information and the selected response information, and determining, depending on setting information that is associated with the access target, whether to display, at the access target, an operation member to activate a chatbot service that is configured to receive input information corresponding to the access target, thereby controlling to display the operation member at the access target.

9. An information processing method executed by an information processing apparatus including a memory and a processor and connected to a user terminal that receives input from a user, the method comprising:

storing, in the information processing apparatus, setting information, including, said setting information including procedure information for searching response information corresponding to scenario information that performs a dialog corresponding to input information, and response information corresponding to the scenario information that performs the dialog corresponding to the input information;

obtaining input information input into the user terminal, executed by the information processing apparatus;

searching for response information corresponding to the input information, executed by the information processing apparatus;

responding to the user terminal with the response information corresponding to the input information, executed by the information processing apparatus;

obtaining an access target to be accessed by the user terminal in order for the user terminal to receive the input of the input information by the user, executed by the information processing apparatus;

selecting scenario information from a plurality of pieces of scenario information, and procedure information and response information corresponding to the selected scenario information based on setting information that is associated with the access target;

changing a way to perform the searching or the responding based on the selected procedure information and the selected response information, executed by the information processing apparatus, and determining, depending on setting information that is associated with the access target, whether to display, at the access target, an operation member to activate a chatbot service that is configured to receive input information corresponding to the access target, thereby controlling to display the operation member at the access target.

10. A non-transitory computer-readable recording medium having computer-readable instructions stored thereon, which when executed, causes a computer including a memory and a processor to execute the information processing method as claimed in claim 9.

11. The information processing apparatus as claimed in claim 1, wherein the setting information includes information representing a range to be set for the search or what response is to be made.

\* \* \* \* \*